(12) United States Patent
Bullock

(10) Patent No.: US 12,059,873 B1
(45) Date of Patent: Aug. 13, 2024

(54) LOAD RESTRAINT STRIP WITH NONWOVEN FABRIC BASE LAYER AND POLYMER FILM OUTER LAYER

(71) Applicant: MBull Holdings, LLC, North Miami Beach, FL (US)

(72) Inventor: Matthew Bullock, McLean, VA (US)

(73) Assignee: MBull Holdings, LLC, North Miami Beach, FL (US)

(*) Notice: Subject to any disclaimer, the term of this patent is extended or adjusted under 35 U.S.C. 154(b) by 0 days.

(21) Appl. No.: 18/195,583

(22) Filed: May 10, 2023

(51) Int. Cl.
| | |
|---|---|
| B32B 27/12 | (2006.01) |
| B32B 5/02 | (2006.01) |
| B32B 5/06 | (2006.01) |
| B32B 5/12 | (2006.01) |
| B32B 7/06 | (2019.01) |
| B32B 7/12 | (2006.01) |
| B32B 27/08 | (2006.01) |
| B32B 27/32 | (2006.01) |
| B32B 27/36 | (2006.01) |

(52) U.S. Cl.
CPC .............. *B32B 27/12* (2013.01); *B32B 5/022* (2013.01); *B32B 5/06* (2013.01); *B32B 5/12* (2013.01); *B32B 7/06* (2013.01); *B32B 7/12* (2013.01); *B32B 27/08* (2013.01); *B32B 27/32* (2013.01); *B32B 27/36* (2013.01); *B32B 2255/10* (2013.01); *B32B 2307/412* (2013.01); *B32B 2307/414* (2013.01); *B32B 2307/518* (2013.01); *B32B 2307/748* (2013.01)

(58) Field of Classification Search
CPC ........... B32B 27/12; B32B 5/022; B32B 5/06; B32B 5/12; B32B 7/06; B32B 7/12; B32B 27/08; B32B 27/32; B32B 27/36; B32B 2255/10; B32B 2307/412; B32B 2307/414; B32B 2307/518; B32B 2307/748
USPC ........................................................ 428/203
See application file for complete search history.

(56) References Cited

U.S. PATENT DOCUMENTS

| | | |
|---|---|---|
| 6,089,802 A | 7/2000 | Bullock |
| 6,227,779 B1 | 5/2001 | Bullock |
| 6,607,337 B1 | 8/2003 | Bullock |
| 6,896,459 B1 | 5/2005 | Bullock |
| 6,923,609 B2 | 8/2005 | Bullock |
| 6,981,827 B2 | 1/2006 | Bullock |
| 7,018,151 B2 | 3/2006 | Bullock |
| 7,066,698 B2 | 6/2006 | Bullock |
| 7,290,969 B2 | 11/2007 | Bullock |
| 7,329,074 B2 | 2/2008 | Bullock |
| 8,113,752 B2 | 2/2012 | Bullock |
| 8,128,324 B2 | 3/2012 | Bullock |
| 8,403,607 B1 | 3/2013 | Bullock |
| 8,403,608 B1 | 3/2013 | Bullock |
| 8,403,609 B1 | 3/2013 | Bullock |

(Continued)

FOREIGN PATENT DOCUMENTS

| | | |
|---|---|---|
| JP | H10245534 A | 9/1998 |
| JP | 2005537993 A | 12/2005 |
| JP | 2011519989 A | 7/2011 |

*Primary Examiner* — Betelhem Shewareged
(74) *Attorney, Agent, or Firm* — Banner & Witcoff, Ltd.

(57) ABSTRACT

A load restraint strip, usable for securing cargo in a cargo container, may have a nonwoven fabric base layer, reinforcing strands bonded to the base layer, an adhesive layer in a portion of a first face of the load restraint strip, and a polymer film layer. The polymer film layer may cover the base layer and may form a second face of the load restraint strip.

20 Claims, 17 Drawing Sheets

(56) References Cited

U.S. PATENT DOCUMENTS

| | | |
|---|---|---|
| 8,408,852 B1 | 4/2013 | Bullock |
| 8,419,329 B1 | 4/2013 | Bullock |
| 8,979,449 B2 | 3/2015 | Bullock |
| 9,090,194 B1 | 7/2015 | Bullock |
| 10,112,525 B1 | 10/2018 | Bullock |
| 10,132,911 B1 | 11/2018 | Bullock |
| 10,654,399 B2 | 5/2020 | Bullock |
| 11,220,205 B2 | 1/2022 | Bullock |
| 2002/0061386 A1* | 5/2002 | Carson .................. B32B 3/266 428/297.4 |
| 2004/0181915 A1 | 9/2004 | Vick |
| 2008/0181742 A1* | 7/2008 | Dry ........................ B60P 7/135 410/118 |
| 2009/0139637 A1 | 6/2009 | Kopf et al. |
| 2015/0043988 A1 | 2/2015 | Bullock |
| 2015/0182407 A1 | 7/2015 | Campbell |
| 2016/0176155 A1 | 6/2016 | Wittig et al. |
| 2018/0354404 A1* | 12/2018 | Bullock .................. B32B 7/12 |

\* cited by examiner

LOAD RESTRAINT STRIP WITH NONWOVEN FABRIC BASE LAYER AND POLYMER FILM OUTER LAYER

BACKGROUND

Intermodal containers are commonly used when shipping goods domestically and/or internationally. Such containers can be loaded onto cargo ships for transport across oceans or other bodies of water. For land transport, these containers can be placed onto a trailer and then hauled overland by truck. Such containers can also be loaded onto railroad flatcars for transport.

Shipping containers can be loaded with boxes, crates, drums, reinforced bags, plastic wrapped bundles, cased goods, metal coils, specialty heavy paper rolls, plastic or metal containers mounted on pallets, and/or numerous other forms of cargo. Maritime and surface transportation regulations require that such loads be restrained from lateral shifting. In particular, a shipping container may experience significant movement as the container is carried by ocean vessel or by other conveyance. If cargo within the intermodal container is not restrained, it may shift and collide with a container wall or container doors. Because the mass of cargo in a container can be significant, such shifting and/or collisions can have catastrophic consequences for transport workers and for the public at large. For example, shifting cargo can be damaged when colliding with a container wall and/or be crushed by other shifting cargo. Damaged cargo can lead to release of product, which product may be toxic or otherwise be hazardous. As another example, shifting cargo might change the center of gravity of the shipping container itself and thereby cause significant problems for the ship, truck or other vehicle carrying the container.

Load restraint strips can be used to secure cargo within a shipping container. Each load restraint strip may be flexible and have an adhesive coated end that is pressed into contact with an interior side wall of the container. The other ends of the load restraint strips may then be wrapped around cargo and tightened. The wrapped ends may be tightened using a tool and method such as are described in U.S. Pat. No. 6,981,827, which patent is incorporated by reference herein. A third adhesive-backed strip may then be applied over the tightened ends to secure those ends together. This procedure may be repeated numerous times inside a single shipping container.

There are various known types of restraining strips. Such strips typically include a backing and some form of reinforcement. Examples of known strips are described in one or more of U.S. Pat. Nos. 6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852, 8,419,329, 8,979,449, 9,090,194, 10,654,399, and 9,333,899.

SUMMARY

This Summary is provided to introduce a selection of some concepts in a simplified form as a prelude to the Detailed Description. This Summary is not intended to identify key or essential features.

A load restraint strip may have a base layer formed from a nonwoven fabric and may include a polymer film layer that forms an outer face of the load restraint strip. The polymer film layer may cover the base layer and may protect the base layer. Printing may be applied to one or more faces of the polymer film layer so as to provide indicia (e.g., letters, numbers, other characters, symbols, graphics, etc.) on the load restraint strip. The load restraint strip may be used to secure cargo in a shipping container.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

Figure 1A:
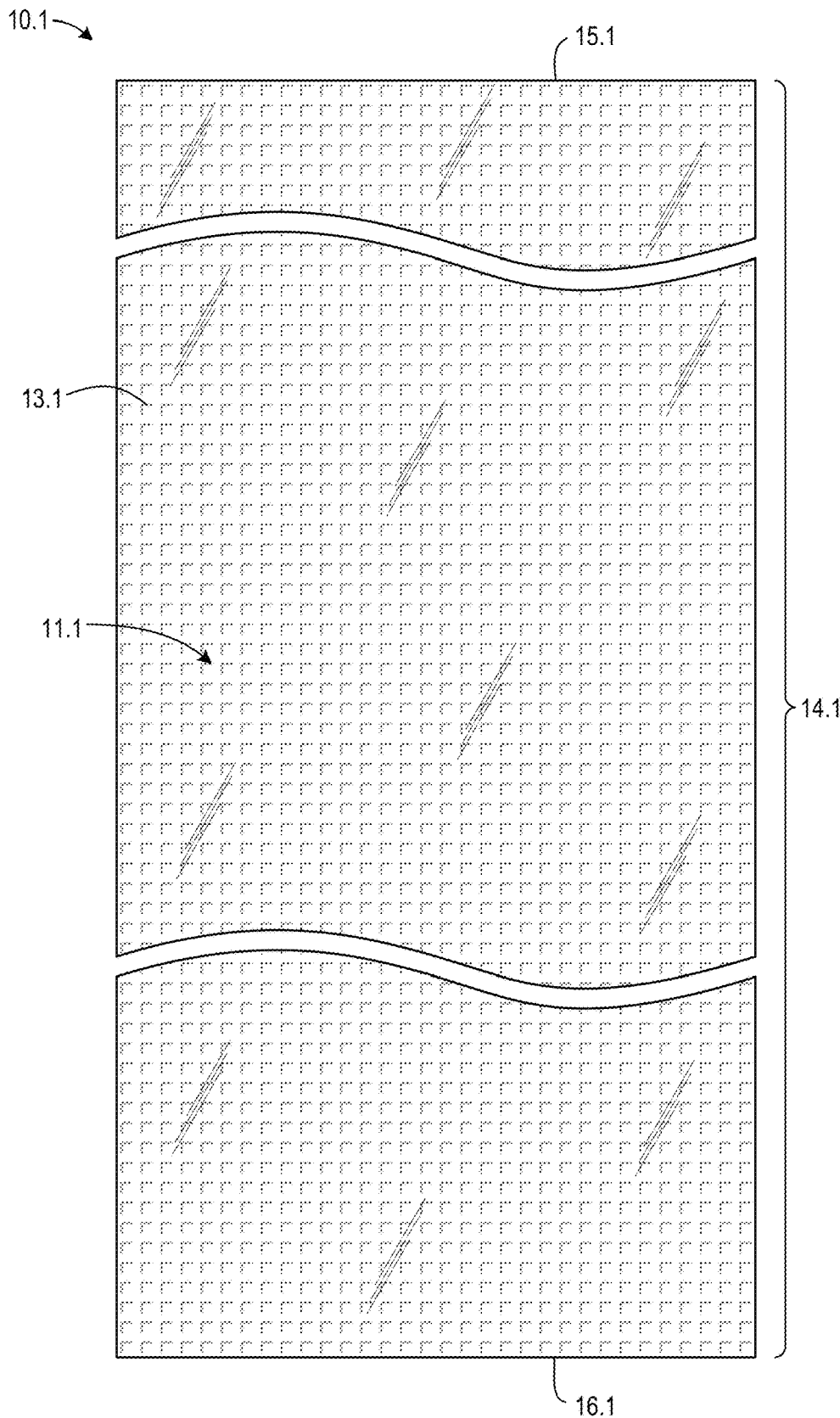
FIG. 1A is partially schematic plan view showing an interior face of an example load restraint strip having a nonwoven fiber base layer and a polymer film outer layer.

Described herein are load restraint strips with a base layer comprising a stitchbond fabric and/or other nonwoven fabric, that further include a polymer film outer layer. In addition to helping protect a load restraint strip from water, humidity, and/or other environmental conditions that may exist inside a cargo container in which that load restraint strip is used, a polymer film outer layer offers many additional advantages when added to a load restraint strip having a nonwoven fabric base layer.

A base layer of a load restraint strip may serve as a carrier to hold reinforcing strands, and those reinforcing strands may provide much or most of the tensile strength of that load restraint strip. Nonwoven fabrics offer numerous advantages as base layer materials. However, some nonwoven fabrics may also have disadvantages. Because of their fibrous natures, some nonwoven fabrics may be prone to snagging. For example, sharp, hooked, and/or barbed edges or corners of cargo, pallets, and other elements inside a cargo container may snag, catch, or grab an exposed surface of a nonwoven fabric base layer. This may result in tearing or other damage.

Moreover, many nonwoven fabrics are porous and may tend to absorb grease or other solvents that may be present in a shipping environment. Such absorbed substances could potentially be undesirably transferred from such nonwoven fabric to cargo secured by a load restraint strip. The porous nature of many nonwoven fabrics, together with the coarse surface of many nonwoven fabrics, may also cause difficulties when printing information onto a load restraint strip (e.g., during manufacture of that load restraint strip). A polymer film outer layer may be used to address these concerns by preventing grease or solvents from reaching a nonwoven fabric base layer and/or by providing smooth, nonporous surfaces for printing.

A polymer film outer layer may also provide an additional tool for adjusting physical properties of a load restraint strip. To perform the function of securing cargo, it is desirable for a load restraint strip to have a high tensile strength in its lengthwise direction. It is also beneficial for a load restraint strip to retain some level of springiness. Otherwise, a load restraint strip may tend to separate from a container wall under a high G shock load. However, stiffness of a load restraint strip (e.g., a tendency to remain in a desired orientation) is also beneficial and may make use of the load restraint strip easier. Increasing stiffness while maintaining desired springiness can be challenging. Although this goal can be achieved by appropriate selection of base layer material type and/or thickness, combining a nonwoven fabric base layer with a polymer film layer allows greater flexibility. For example, inclusion of a polymer film layer may allow use of a thinner, less robust, and potentially less-expensive type and/or grade of nonwoven fabric than might otherwise be used in the absence of a polymer film layer.

Additionally, a polymer film outer layer may significantly increase resistance of a load restraint strip to damage from tearing, puncture, or bursting. A polymer film outer layer may also significantly increase the abrasion resistance of a load restraint strip relative to a load restraint strip with an exposed nonwoven fabric base layer. In particular, adding a polymer film outer layer to a load restraint strip may significantly increase a "rub count" for the face of the load restraint strip with the polymer film outer layer. Rub count represents a number of times that a material experiences a rubbing motion across its surface before the material begins to wear through. An increased rub count may be particularly beneficial for a face of a load restraint strip that faces cargo and that will experience rubbing by the cargo during normal shipping.

Figure 1B:
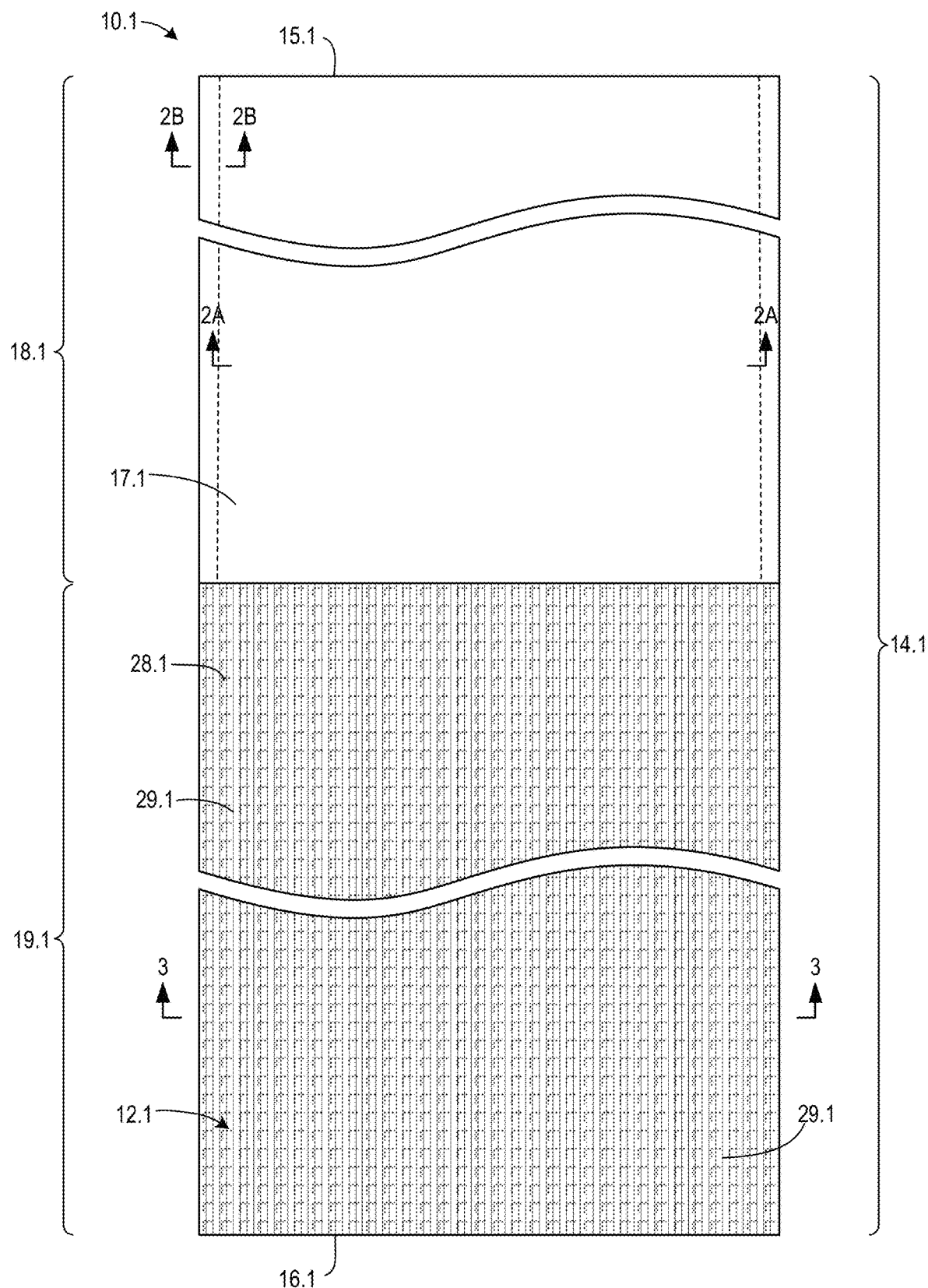
FIG. 1B is partially schematic plan view showing an exterior face of the load restraint strip of FIG. 1A.

FIG. 1A is partially schematic plan view showing an interior face 11.1 of an example load restraint strip 10.1. FIG. 1B is partially schematic plan view showing an exterior face 12.1 of the load restraint strip 10.1. An exterior face of a load restraint strip is the face that includes the adhesive that contacts a container wall when the load restraint strip is attached to that wall. In general, and except for portions in an end of the load restraint strip that is wound with the end of another load restraint strip during tightening, the exterior face of a load restraint strip faces away from cargo when the load restraint strip is installed. An exterior face or side of an element of a load restraint strip is a side or face of that element that, when the load restraint strip is laid flat (as in FIGS. 1A-1C), faces the same direction as the adhesive. An interior face of a load restraint strip is the face opposite the exterior face and that, except for portions in an end of the load restraint strip that is wound with the end of another load restraint strip during tightening, generally faces toward cargo when the strip is installed. An interior face or side of an element of a load restraint strip is a side or face of that element that, when the load restraint strip is laid flat, faces the same direction as the load restraint strip interior face.

Figure 1C:
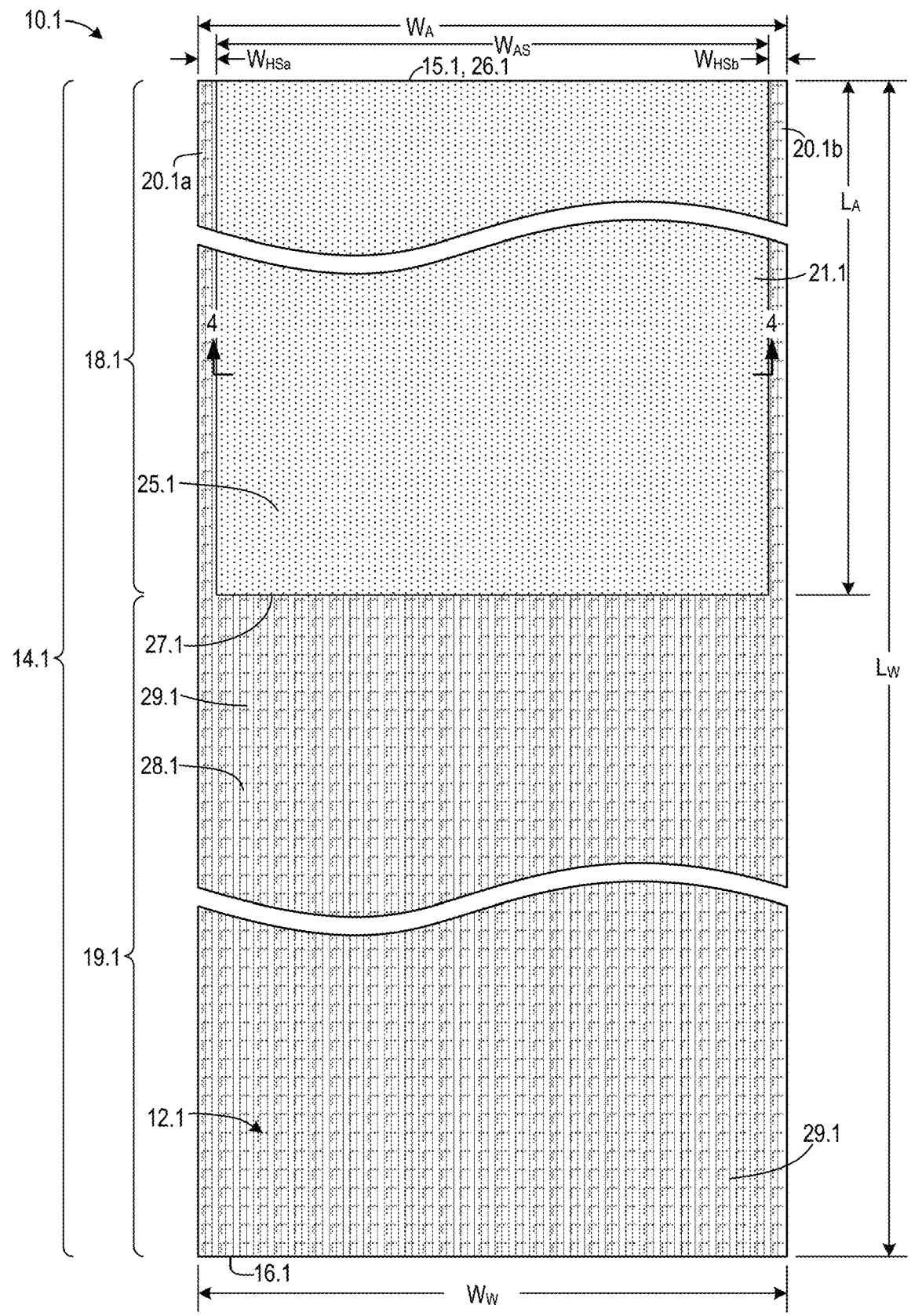
FIG. 1C is a partially schematic plan view showing the exterior face of the load restraint strip of FIG. 1A after removal of a release paper liner.

Wave-shaped notations are added to FIGS. 1A through 1C to schematically indicate portions of the load restraint strip 10.1 that have been omitted from the figures for convenience, but that are present in an actual load restraint strip. The notations do not represent actual interruptions in the structure of the load restraint strip 10.1. Instead, each of the notations represents a portion of the load restraint strip 10.1 that extends continuously and unbroken over an arbitrary length and that has structure identical to structure in the regions immediately adjacent to the notation. Also visible in FIG. 1A is a band 13.1 of stitchbond fabric that forms a base layer of the load restraint strip 10.1. As explained in more detail below, the stitchbond fabric of the band 13.1 may comprise a nonwoven mat through which knitted yarns penetrate. The load restraint strip 10.1 has a working portion 14.1. In the example of the load restraint strip 10.1, working portion 14.1 extends the entire length of the load restraint strip 10.1 from a first strip end 16.1 to a second strip end 15.1. However, a working portion of a load restraint strip may be less than the entire length of that load restraint strip. Multiple load restraint strips 10.1 may be joined together and wound on a roll. Lines and/or perforations may separate ends 15.1 and 16.1 of adjacent load restraint strips 10.1 on that roll. The load restraint strips 10.1 can be removed from the roll by tearing and/or cutting along the lines and/or perforations.

FIG. 1B shows the exterior face 12.1 of the load restraint strip 10.1 in a lined configuration. In particular, and as explained in further detail below, a release paper liner 17.1 is attached to cover an adhesive layer in an attachment region 18.1. FIG. 1C is another partially schematic plan view showing the exterior face 12.1 of the load restraint strip 10.1, but with the release paper liner 17.1 removed to expose an adhesive layer 25.1. Once exposed by removal of the liner 17.1, the adhesive layer 25.1 can be pressed against an interior wall of a cargo container so as to secure the attachment region 18.1 of the load restraint strip 10.1 to that container wall. A tail 19.1 of the load restraint strip 10.1 can then extend away from attachment region 18.1. That tail 19.1 may, after securing of the attachment region 18.1, initially extend along the container wall. As described in more detail below, tail 19.1 may subsequently be wrapped around cargo and then tightened with, and secured to, a tail of another load restraint strip. The broken lines extending lengthwise in the attachment region 18.1 in FIG. 1B indicate edges of the adhesive layer 25.1 in the attachment region 18.1, as well as edges of handling subregions 20.1*a* and 20.1*b* shown in FIG. 1C.

In the example of the load restraint strip 10.1, the adhesive layer 25.1 extends throughout an adhesive subregion 21.1 of the attachment region 18.1. The adhesive subregion 21.1 has a width $W_{AS}$. The handling subregions 20.1a and 20.1b have respective widths $W_{HSa}$ and $W_{HSb}$ and extend from edges of the adhesive subregion 21.1 to side edges of the load restraint strip 10.1. An end 26.1 of the adhesive layer 25.1, the attachment subregion 21.1, and the attachment region 18.1 is aligned with the end 15.1 of the load restraint strip 10.1 and of the working portion 14.1. An end 27.1 of the adhesive layer 25.1, the attachment subregion 21.1, and the attachment region 18.1 is located at an intermediate location between the end 15.1 and the end 16.1 of the load restraint strip 10.1 and of the working portion 14.1. As indicated in FIG. 1C, the working portion 14.1 has a length $L_W$ and a width $W_W$. The attachment region 18.1 has a length $L_A$ and width $W_A$, and $W_A$ may equal $W_W$. The handling subregions 20.1a and 20.1b may be sub-regions of the attachment region 18.1 in which the adhesive of the adhesive layer 25.1 has been omitted, and which may provide convenient regions for a worker to grip the attachment region during installation of the load restraint strip 10.1. Widths $W_{HSa}$ and $W_{HSb}$ of the handling subregions 20.1 may, for example, be between 1 and 2 inches. The length $L_W$ may, for example, be between 9 and 14 feet (e.g., 12 feet). The length $L_A$ may, for example, be between 2 and 6 feet (e.g., 5 feet). The width $W_W$ may, for example, be between 10 and 50 inches (e.g., 16 inches., 32 inches, 36 inches, or 40 inches). Optionally, $W_A$ may be less than $W_W$, and/or the handling subregions 20.1 may be omitted (e.g., the adhesive of the adhesive region 25.1 may extend to side edges of the attachment region 18.1).

As seen in FIGS. 1B and 1C, and as discussed more fully below, the load restraint strip 10.1 includes a plurality of reinforcing strands 29.1 in a reinforcement layer 28.1. The strands 29.1 are indicated as black lines on exterior face 12.1. To avoid obscuring FIGS. 1B and 1C with unnecessary detail, the number of black lines is significantly less than the number of reinforcing strands that may be present in an actual load restraint strip 10.1. Moreover, the strands 29.1 could be white, off-white, or otherwise lightly colored, translucent, or transparent. In the example of the load restraint strip 10.1, and as shown in FIGS. 1B and 1C, the reinforcement strands 29.1 only extend in a direction parallel to the length $L_W$ of the load restraint strip 10.1.

Figure 2A:
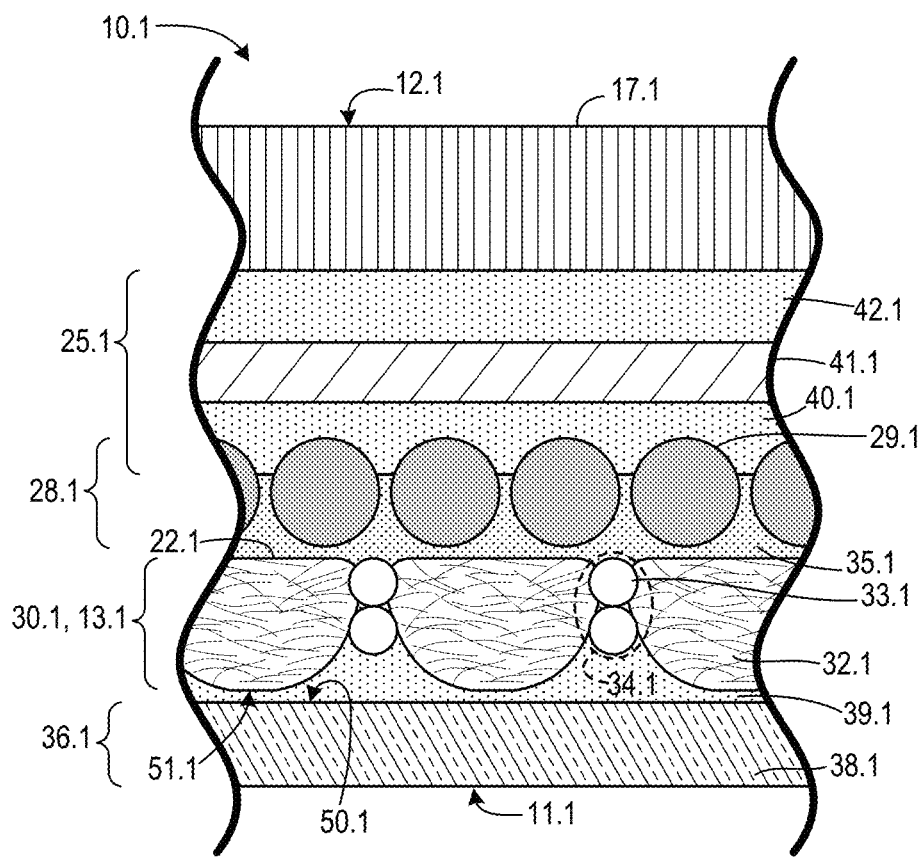
FIG. 2A is a partially schematic truncated cross-sectional view taken from the location indicated in FIG. 1B.

FIG. 2A is a partially schematic truncated cross-sectional view of the load restraint strip 10.1 taken from the location indicated in FIG. 1B. FIG. 2A shows elements of the attachment region 18.1 when the load restraint strip 10.1 is in a lined configuration, i.e., with release paper liner 17.1 in place. The bold, curved truncation lines at the sides of FIG. 2A indicate that the structure shown in FIG. 2A extends throughout the adhesive subregion 21.1 of the attachment region 18.1.

In addition to adhesive layer 25.1 and reinforcement layer 28.1, the load restraint strip 10.1 includes a base layer 30.1. The reinforcement layer 28.1 and the base layer 30.1 extend throughout the entire length of working portion 14.1 of the load restraint strip 10.1, whereas attachment layer 25.1 is confined to attachment region 18.1.

The base layer 30.1 may comprise a nonwoven fabric. Nonwoven fabrics may, for example, comprise spun-bonded polymer fiber materials (e.g., a spun bonded polyethylene fiber mat), felted fiber mats, and/or other materials that comprise webs/mats of fibers that have not been woven, and that have been bonded chemically, bonded using heat or other treatment, and/or bonded mechanically. Mechanical bonding may comprise needle punching (e.g., felting), hydro entanglement, and/or stitch bonding. In the example of the load restraint strip 10.1, the base layer 30.1 comprises a nonwoven fabric band 13.1 consisting of a stitchbond fabric. As is known in the textile arts, stitchbond fabric is created by mechanically bonding nonwoven material with stitches. Stitchbond fabric is also known as "stitch bond," "stichbond," "stitchbonded," "stitch bonded," and "stitch-bonded" fabric. Although stitchbond fabric is created through a process that may be called stitchbonding (or "stitch bonding," etc.), a stitchbond fabric has a particular type of fabric structure that is distinct from fabric structures formed by other processes. In particular, a stitchbond fabric is a hybrid material in which a nonwoven fiber substrate material is reinforced and structurally defined by knitting stitches that penetrate that substrate. In some types of stitchbond fabric, the substrate may be a mat or web of nonwoven fibers, and the stitching may be separate yarns that penetrate that substrate, with those yarns knitted to create a pattern of nonwoven regions separated by stitching yarns. In other types of stitchbond fabric, the stitching may be created by fibers taken from the nonwoven mat. There are numerous types of stitchbond fabrics. A Maliwatt stitchbond fabric comprises a mat of nonwoven batting that is knitted together by a stitching yarn that penetrates the batting. A Malivlies stitchbond fabric is similar to Maliwatt, but a separate stitching yarn is not used. Instead, fibers taken from the batting are used to form stitches in the batting. Other types of stitchbond fabrics include, without limitation, Kunit, Multiknit, Malipol, Voltex, and Malimo fabrics.

As represented schematically in FIG. 2A, the band 13.1 comprises a mat 32.1 of nonwoven fiber batting. Knitting yarn lengths 33.1 penetrate the mat 32.1 and form stitches 34.1. For simplicity, the stitches 34.1 in the band 13.1 are represented as portions of two different yarn lengths lying adjacent one another. However, those stitches would also include loops of those yarn lengths mechanically linking those yarn lengths to each other. Various types of stitches may be used, and the density and arrangement of stitches may vary. For example, the material of band 13.1 may be a Maliwatt fabric formed from a mat of carded 1.5 denier per fiber polyester fibers and having stitching yarns running in a machine direction, with the fabric having a basis weight of between 65 grams per square meter (gsm) and 300 gsm. Table 1 lists properties of an example stitchbond fabric that may be used for the material of band 13.1.

TABLE 1

Example Stitchbond Fabric Properties

| Property | Example Value |
| --- | --- |
| basis weight (in ounces/yard$^2$) | 4.6 |
| thickness (mils) | 25 |
| grab tensile strength, machine direction (lbs) | 82 |
| grab tensile strength, cross direction (lbs) | 80 |
| elongation, machine direction (%) | 16 |
| elongation, cross direction (%) | 8 |
| modulus (lbs) | 64 |

The basis weight in Table 1 represents measurements according to the method described by ASTM standard D3776. The thickness in Table 1 represents measurements according to the method described by ASTM standard D1777. The grab tensile strengths in Table 1 represents measurements according to the method described by ASTM standard D5034. A stitchbond fabric used as the material of band 13.1 may, for example, have values for one or more of the properties in Table 1 that are approximately as shown in Table 1, e.g., within a range of +/−5% of a value shown in Table 1. For example, a stitchbond fabric used as the material of band 13.1 may have a basis weight of between 4.4 ounces/yard$^2$ and 4.8 ounces/yard$^2$, and/or a thickness of between 24 mils and 26 mils, and/or a machine direction grab tensile strength of between 78 lbs and 86 lbs, and/or a cross direction grab tensile strength of between 76 lbs and 84 lbs, and/or a machine direction elongation of between 15% and 17%, and/or a cross direction elongation of between 7.6% and 8.4%, and/or a modulus of between 61 lbs and 67 lbs. Other types of stitchbond fabrics having one or more properties outside of one or more ranges indicated in Table 1 may be used. For example, the inclusion of a polymer film outer layer, as described below, may facilitate use of lighter weight (and/or less expensive and/or less durable) types of stitchbond fabric so as to achieve stiffness in the load restraint strip 10.1 that may require, in the absence of such polymer film outer layer, use of a heavier and/or more expensive type of stitchbond fabric.

A stitchbond fabric used as the material of the band 13.1, and/or other nonwoven fabrics used as a base layer in a load restraint trip, may comprise one or more agents that have been applied to the fabric by immersion or other technique. A stitchbond (or other nonwoven fabric) may, for example, comprise an adhesive primer agent, a static reduction agent, and/or a sizing agent (e.g., starch).

The reinforcement layer 28.1 is fixed relative to the base layer 30.1. In particular, the reinforcement strands 29.1 are bonded to an exterior face 22.1 of the band 13.1 by a laminating adhesive 35.1. The strands 29.1 may be parallel to one another and to the length $L_W$ direction of working portion 14.1, and the load restraint strip 10.1 may omit reinforcement strands oriented in other directions. Each of the strands 29.1 may, for example, comprise one or more polymer fibers and have a denier (i.e., a linear mass density in grams per 9000 meters) of between about 1400 and about 1650. For example, the strands 29.1 may have a denier between about 1450 and about 1600 (e.g., between about 1479 and about 1547, with target denier of about 1513). The reinforcement layer may comprise between about 100 reinforcing strands 29.1 and about 320 reinforcing strands 29.1 in a load restraint strip having a width $W_W$ of 16 inches, resulting in a strand distribution density (in a direction across width $W_W$ and perpendicular to length $L_W$) of between 6.25 and 20 strands per inch. A load restraint strip (regardless of width $W_W$) may, for example, have a strand distribution density (in a direction across width $W_W$ and perpendicular to length $L_W$) of between 5 and 25 strands per inch. Example materials for the strands 29.1 comprise polyester. Table 2 shows example properties for polyester strands that may be used for reinforcing strands 29.1.

TABLE 2

Example Polyester Strand Properties

| Property | Target Value | Min. Value | Max. Value |
| --- | --- | --- | --- |
| liner density (denier, i.e. g/9000 m) | 1513 | 1479 | 1547 |
| break load (pounds) | 26.6 | 24.6 | 28.7 |
| elongation at break (%) | 10.3 | 8.8 | 11.8 |
| elongation at 10 lb. load (%) | 3.4 | 2.9 | 3.9 |
| shrinkage, free (%) | 8.4 | 4.8 | 12.0 |

The ranges in Table 2 are solely for purposes of example. Load restraint strips may comprise reinforcing strands having one or more properties significantly outside a range indicated in Table 2. A reinforcement layer of a load restraint strip may also or alternatively comprise reinforcement strands formed from glass, polypropylene, carbon, or some other material. The reinforcing layer 28.1 may have tensile strength, in a direction parallel to length $L_W$, that is greater than a tensile strength of the base layer 30.1, and/or greater than a combined tensile strength of the base layer 30.1 and a polymer film outer layer 36.1.

The laminating adhesive 35.1 may comprise a transparent ethylene vinyl acetate water-based copolymer adhesive having a viscosity between about 2900 centipoise (cps) and about 3200 cps. However, load restraint strips may comprise a laminating adhesive having a viscosity significantly outside this range and/or that comprises a different type of adhesive. As indicated above, adhesive 35.1 is used to bond the reinforcing fibers 29.1 to the exterior face 22.1 of the band 13.1.

The polymer film outer layer 36.1 is fixed relative to the base layer 30.1 and relative to the reinforcement layer 28.1. A polymer film outer layer may comprise one or more sheets of a polymer material (e.g., a nonporous polymer material), and may be bonded to a base layer (e.g., bonded directly to a base layer). In the example of the load restraint strip 10.1, the polymer film outer layer 36.1 comprises a single sheet 38.1 of a polymer material having a face 50.1 that is directly bonded to a face 51.1 of the band 13.1 by an adhesive 39.1. The adhesive 39.1 may, for example, comprise a laminating adhesive (e.g., such as those described above).

Examples of polymers that may be used for the polymer material sheet 38.1 comprise polyethylene (PE), polyethylene terephthalate (PET), biaxially-oriented polypropylene (BOPP), polypropylene (PP), high density polyethylene (HDPE), medium density polyethylene (MDPE), low density polyethylene (LDPE), and/or other materials.

The polymer material sheet 38.1 may be transparent, translucent, or opaque. The polymer material sheet 38.1 may be tinted or untinted. Example properties of polymers that may be used for the polymer material sheet 38 comprise elasticity less than 40%, tensile strength of up to 100 psi (pounds per square inch), and a basis weight of less than 50 gsm. However, load restraint strips may comprise polymer film outer layers formed from polymers with one or more of these properties having a value significantly outside one of the aforementioned ranges.

The adhesive layer 25.1 is fixed relative to reinforcement layer 28.1, relative to the base layer 30.1, and relative to the polymer film outer layer 36.1. Unlike the reinforcement layer 28.1, the base layer 30.1, and the polymer film outer layer 36.1, however, and as seen in FIG. 1C, the adhesive layer 25.1 is confined to attachment region 18.1. The adhesive layer 25.1 may, for example, comprise a first adhesive sublayer 42.1, a second adhesive sublayer 40.1 and a substrate sublayer 41.1. The substrate sublayer 41.1 at least partially separates the adhesive sublayers 42.1 and 40.1. The substrate 41.1 may include holes or other perforations permitting direct contact between the adhesive sublayers 42.1 and 40.1 in certain areas. The substrate 41.1 may optionally be omitted. The release paper liner 17.1 is affixed to the exterior side of the adhesive sublayer 42.1 when the load restraint strip 10.1 is in a lined configuration. The liner 17.1 may, for example, be formed from a paper product that is treated (e.g., coated or otherwise impregnated with wax, silicone or other non-stick material) to resist the adhesive of the sublayer 42.1.

The adhesive sublayers 42.1 and 40.1 may contain the same type of adhesive. For example, the adhesive sublayers 42.1 and 40.1 contain an acrylic adhesive having a shear strength of between about 50 psi and about 100 psi. The adhesive layer 25.1 may, for example, have a thickness of approximately 3 mils (with 1 mil=0.001 inch). However, a load restraint strip having one or more features described herein may alternatively have an adhesive layer adhesive with properties significantly outside that shear strength range and/or having a substantially different thickness.

The substrate sublayer 41.1 may comprise a film of PET or other polymer and may have a thickness of between about 0.5 mils and about 1.0 mils. If a substrate sublayer is present, it may make little or no contribution to the load restraining strength of a load restraint strip and may simply serve as a carrier for adhesive sublayers 42.1 and 40.1. In particular, the adhesive layer 25.1 may initially take the form of a double-sided adhesive tape having the substrate sublayer 41.1 sandwiched by the adhesive sublayers 40.1 and 42.1. The release paper liner 17.1 may be attached to one side of that tape. A portion of that double-sided tape may be cut from a larger roll and applied to a portion of a partially-completed load restraint strip during a manufacturing process. As indicated above, a substrate sublayer may be omitted. If a substrate sublayer is omitted, a layer of acrylic adhesive substantially similar to the sublayer 42.1 may be applied to a partially-completed load restraint strip using transfer tape or other process (e.g., direct application via spraying and/or distributed using a spreader blade and/or partially cured after application/spreading).

Alternatively, the sublayers 42.1 and 40.1 may comprise different types of adhesives. The adhesive sublayer 42.1 is adhered to a shipping container wall when the load restraint strip 10.1 is installed. Many applications require that the adhesive bond the between the sublayer 42.1 and a container wall be nonpermanent. When a container reaches its destination and the load restraint strip 10.1 is removed, it is desirable that little or no adhesive residue remain on the container wall. For this and other reasons, it is often desirable for the sublayer 42.1 to be a high shear strength pressure-sensitive acrylic adhesive that can accommodate a large temperature gradient. Because adhesive the sublayer 40.1 does not contact a container wall, however, adhesive residue is not a concern for this layer. Accordingly, the sublayer 40.1 may comprise other types of adhesives having different properties than the adhesive used for the sublayer 42.1. For example, the adhesive of the sublayer 40.1 may be selected to have higher shear and peel strengths than the adhesive of the sublayer 42.1 so as to ensure that the substrate sublayer 41.1 does not separate from the load restraint strip 10.1 when the strip 10.1 is removed from a container wall. For example, the sublayer 40.1 adhesive may be a rubber-based type of adhesive or could be an acrylic adhesive with a different formulation than the adhesive of the sublayer 42.1.

Figure 2B:
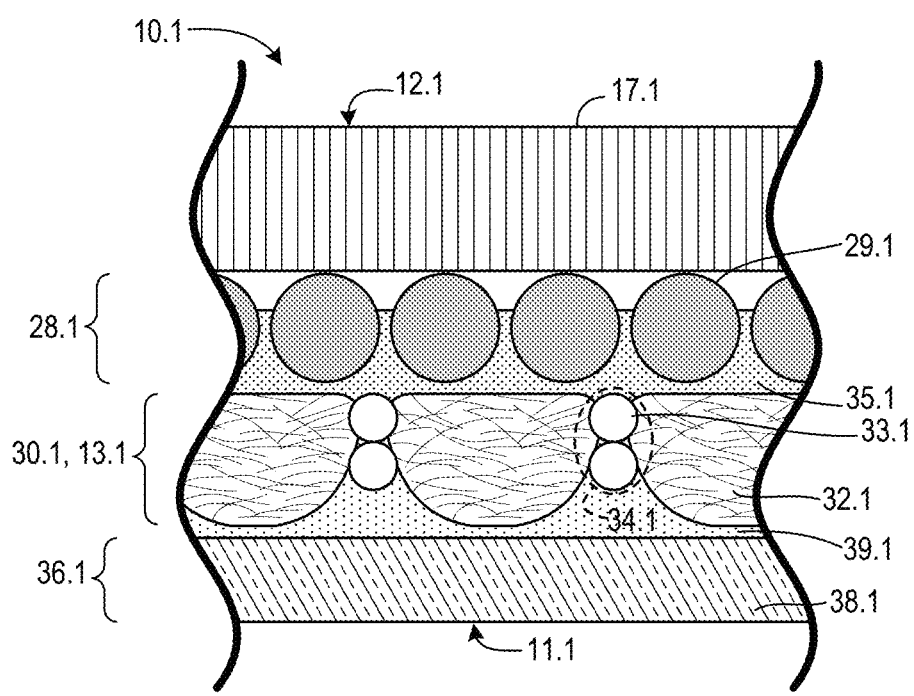
FIG. 2B is a partially schematic truncated cross-sectional view taken from the location indicated in FIG. 1B.

FIG. 2B is a partially schematic truncated cross-sectional view of the load restraint strip 10.1 taken from the location indicated in FIG. 1B. The bold, curved truncation lines at the sides of FIG. 2B indicate that the structure shown in FIG. 2B extends throughout a portion of the attachment region 18.1 width $W_A$ that corresponds to the handling subregion 20.1*a* associated with the 2B-2B sectioning marks in FIG. 1B. As seen in FIG. 2B, the structure of the load restraint strip 10.1 in the handling region 20.1*a* is similar to that shown in FIG. 2A, but without the adhesive layer 25.1. The handling subregion 20.1*b* may have a structure that is the same as that shown in FIG. 2B.

Figure 3:
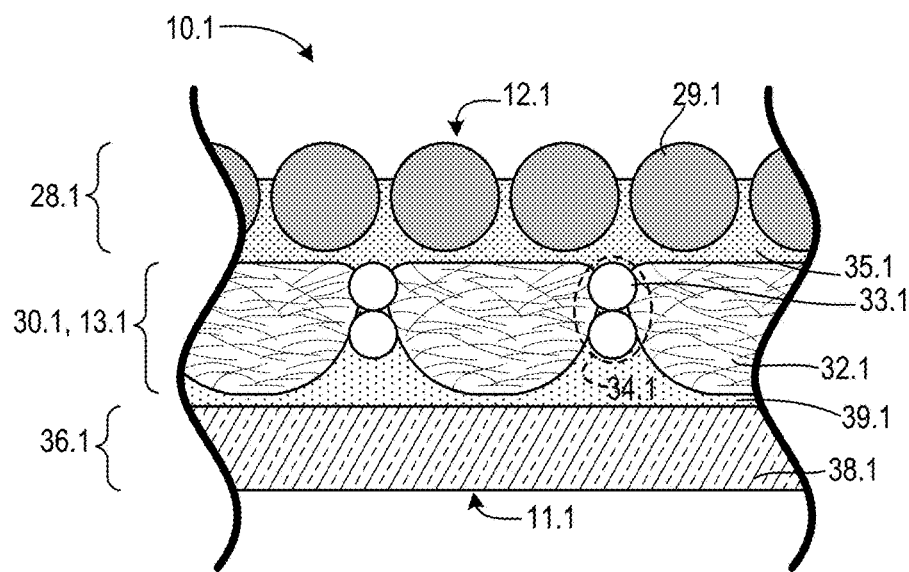
FIG. 3 is a partially schematic truncated cross-sectional view taken from the location indicated in FIG. 1B.

FIG. 3 is a partially schematic truncated cross-sectional view of the load restraint strip 10.1 taken from the location indicated in FIG. 1B. The bold, curved truncation lines at the sides of FIG. 3 indicate that the structure shown in FIG. 3 extends throughout the width $W_W$ of the tail 19.1. As seen in FIG. 3, the structure of the load restraint strip 10.1 in the tail 19.1 is similar to the structure shown in FIG. 2A, but with the adhesive layer 25.1 and the liner 17.1 absent.

Figure 4:
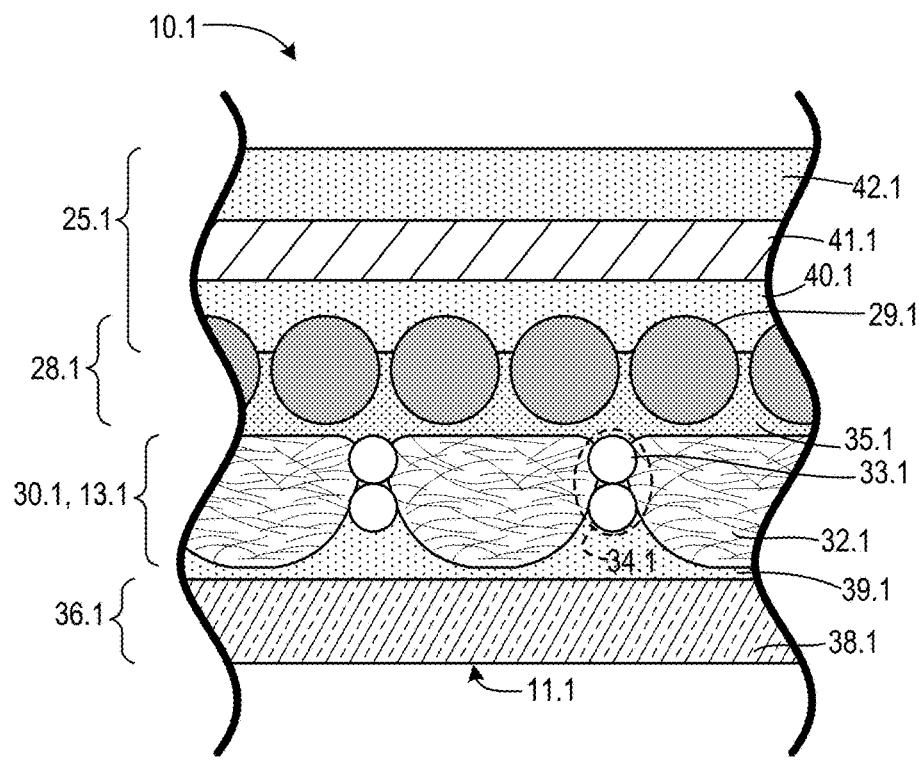
FIG. 4 is a partially schematic truncated cross-sectional view taken from the location indicated in FIG. 1C.

FIG. 4 is a partially schematic truncated cross-sectional view of the load restraint strip 10.1 taken from the location indicated in FIG. 1C. The bold, curved truncation lines at the sides of FIG. 4 indicate that the structure shown in FIG. 4 extends throughout the width $W_{AS}$ of the adhesive subregion 21.1 after removal of the release paper liner 17.1.

Figure 5A:
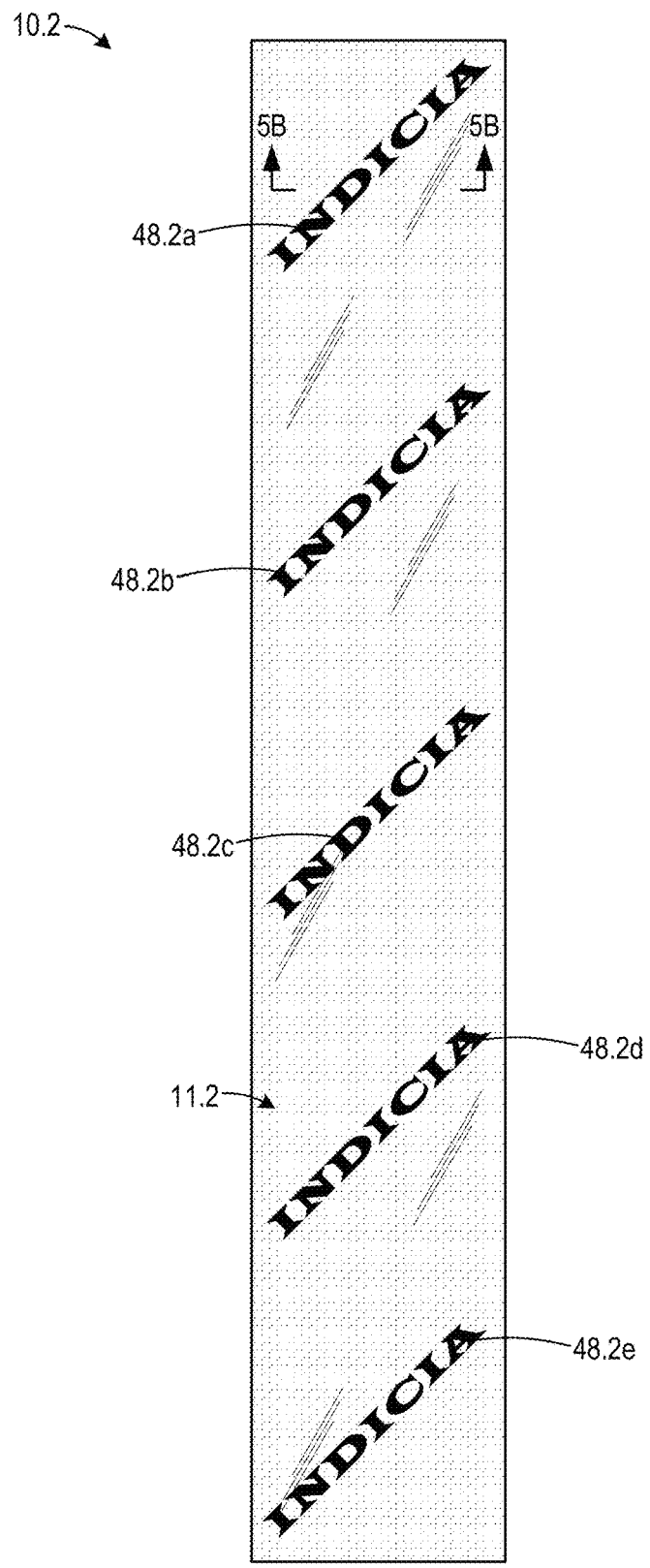
FIG. 5A is partially schematic plan view showing an interior face of an example load restraint strip similar to that of FIG. 1A, but having a nonwoven fiber base layer and a polymer film outer layer with printed indicia.

FIG. 5A is partially schematic plan view showing an interior face of an example load restraint strip 10.2. Except as indicated below, the load restraint strip 10.2 may be the same as or similar to the load restraint strip 10.1. The load restraint strip 10.2 has indicia 48.2*a*, 48.2*b*, 48.2*c*, 48.2*d*, and 48.2*e* that are visible to an observer viewing an interior face 11.2 of the load restraint strip 10.2. More or fewer indicia may be present. Although the word "INDICIA" is used for an example, any of indicia 48.2*a* through 48.2*e*, and/or other indicia, may be any combination of letters, numbers, other characters, symbols, and/or graphics. The indicia 48.2*a* through 48.2*e* need not be the same.

Figure 5B:
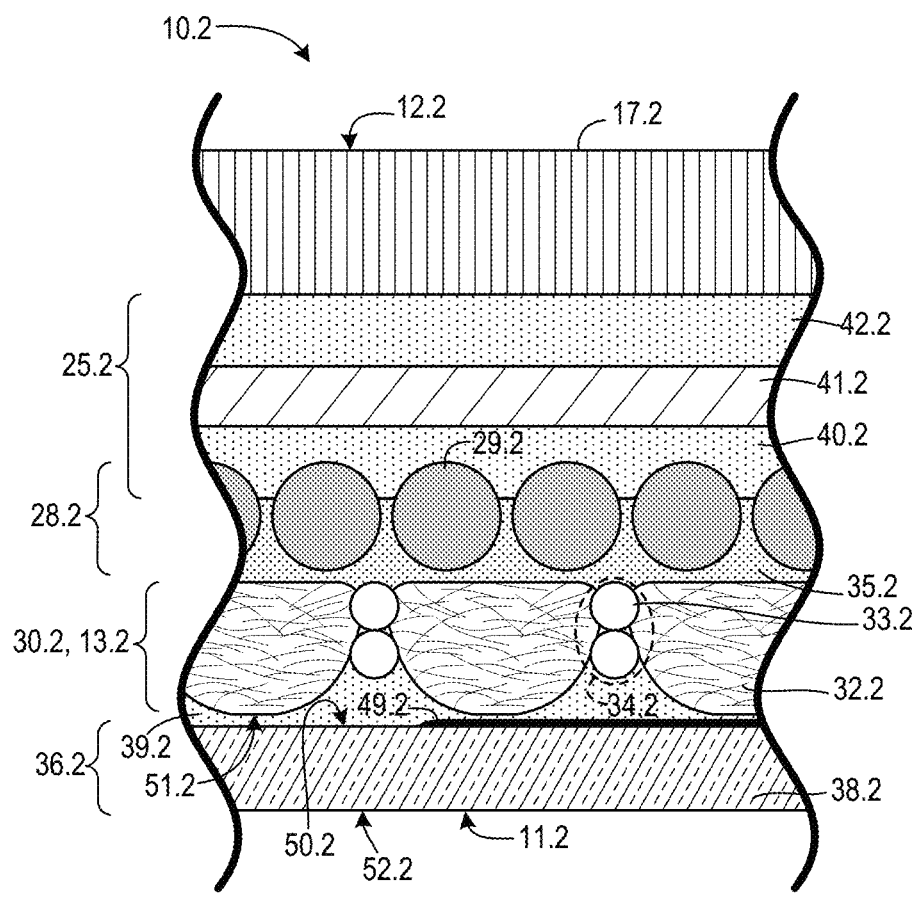
FIG. 5B is a partially schematic truncated cross-sectional view taken from the location indicated in FIG. 5A.

FIG. 5B is a partially schematic truncated cross-sectional view taken from the location indicated in FIG. 5A. The view of FIG. 5B has also been rotated 180° so as to have the same orientation of FIGS. 2A through 4. Exterior face 12.2, release paper liner 17.2, adhesive layer 25.2, reinforcement layer 28.2, reinforcement strands 29.2, base layer 30.2/band 13.2, mat 32.2, knitting yarn lengths 33.2, stitches 34.2, laminating adhesive 35.2, polymer material sheet 38.2, adhesive 39.2, second adhesive sublayer 40.2, substrate sublayer 41.2, and first adhesive sublayer 42.2 may respectively be the same as (or similar to) the exterior face 12.1, the release paper liner 17.1, the adhesive layer 25.1, the reinforcement layer 28.1, the reinforcement strands 29.1, the base layer 30.1/band 13.1, the mat 32.1, the knitting yarn lengths 33.1, the stitches 34.1, the laminating adhesive 35.1, the polymer material sheet 38.1, the adhesive 39.1, the second adhesive sublayer 40.1, the substrate sublayer 41.1, and the first adhesive sublayer 42.1 of the load restraint strip 10.1.

The polymer film layer 36.2 of the load restraint strip 10.2 differs from the polymer film layer 36.1 of the load restraint strip 10.1 by including the indicia 48.2*a* through 48.2*e*. To provide the indicia 48.2*a* through 48.2*e*, ink 49.2 may be printed on an exterior face 50.2 of the polymer material sheet 38.2. Also, or alternatively, indicia may be provided by printing (e.g., prior to application of the adhesive 39.2) on an interior face 51.2 of the band 13.2 and/or on an interior face 52.2 of the sheet 38.2. Printing on the face 50.2 and/or the face 52.2 allows indicia to be printed separately from other processes associated with manufacture of the load restraint strip 10.2. For example, a roll of polymer material used for polymer material sheets of multiple load restraint strips 10.2 may be printed in advance (e.g., by a material vendor and/or in a facility other than a production line for the load restraint strip 10.2) and stored until needed. Printing on the face 50.2 also protects the indicia from being inadvertently removed from a load restraint strip by abrasion, moisture, etc. Moreover, the faces 50.2 and/or 52.2 may be smoother and less porous than the face 51.2, thereby allowing printing that is crisper, better defined, and/or otherwise of better quality than may be economically achieved by printing on the face 51.2.

Figure 6:
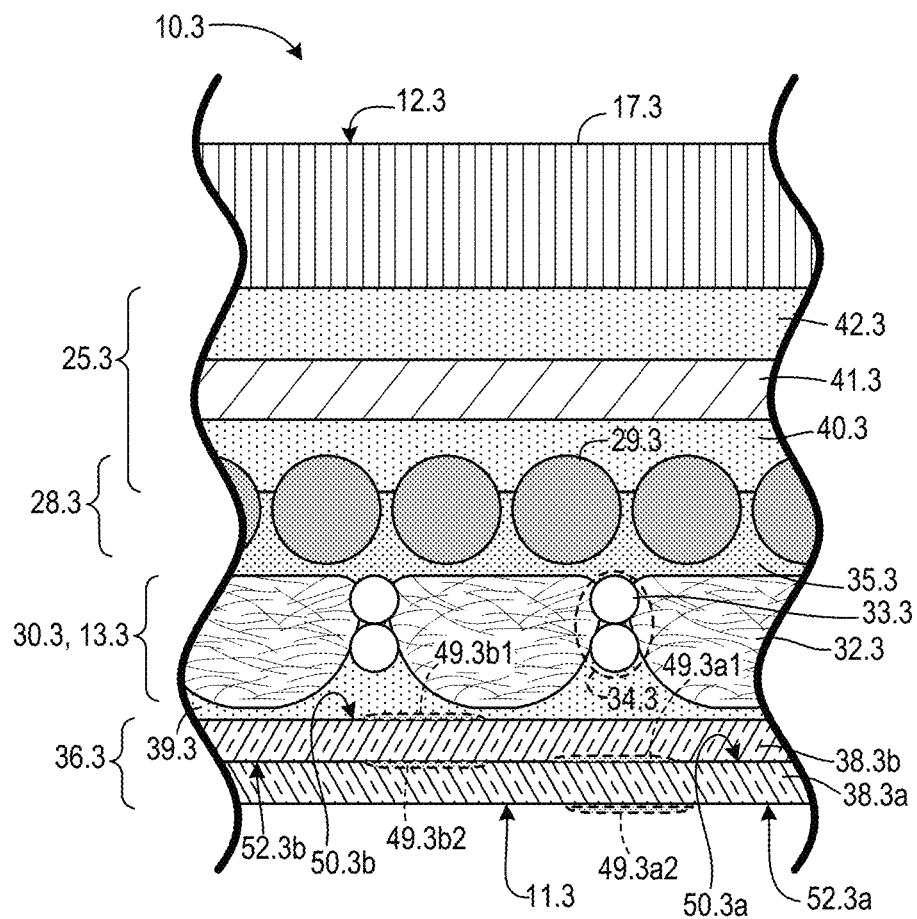
FIG. 6 is a partially schematic truncated cross-sectional view of an example load restraint similar to that of FIG. 1A, but that comprises a polymer film outer layer comprising multiple layers of polymer material.

FIG. 6 is a partially schematic truncated cross-sectional view of a load restraint strip 10.3. Except as indicated below, the load restraint strip 10.3 may be the same as or similar to the load restraint strip 10.1. The cross-sectional view of FIG. 6 may be taken from a location in the load restraint strip 10.3 similar to the location, indicated in FIG. 1B, from which the cross-sectional view of FIG. 2A is taken. Exterior face 12.3, release paper liner 17.3, adhesive layer 25.3, reinforcement layer 28.3, reinforcement strands 29.3, base layer 30.3/band 13.3, mat 32.3, knitting yarn lengths 33.3, stitches 34.3, laminating adhesive 35.3, adhesive 39.3, second adhesive sublayer 40.3, substrate sublayer 41.3, and first adhesive sublayer 42.3 may respectively be the same as (or similar to) the exterior face 12.1, the release paper liner 17.1, the adhesive layer 25.1, the reinforcement layer 28.1, the reinforcement strands 29.1, the base layer 30.1/band 13.1, the mat 32.1, the knitting yarn lengths 33.1, the stitches 34.1, the laminating adhesive 35.1, the adhesive 39.1, the second adhesive sublayer 40.1, the substrate sublayer 41.1, and the first adhesive sublayer 42.1 of the load restraint strip 10.1.

The polymer film layer 36.3 of the load restraint strip 10.3 differs from the polymer film layer 36.1 of the load restraint strip 10.1 by replacing the single polymer material sheet 38.1 with polymer material sheets 38.3a and 38.3b. Each of the sheets 38.3a and 38.3b may comprise any of the polymers described herein for use as a polymer material sheet. The polymer material sheets 38.3a and 38.3b may extend across the entire working width and working length of the load restraint strip 10.3, with a face 52.3a of the sheet 38.3 forming an interior face 11.3 of the load restraint strip 10.3. A face 50.3a of the sheet 38.3a may be bonded to a face 52.3b of the sheet 38.3b by heat fusion, using an adhesive (not shown) or by other process. That bonding may occur prior to incorporation of the polymer film layer 36.3 into the load restraint strip. Indicia may be provided by printing on any of the faces 50.3b (e.g., printing 49.3b1), 52.3b (e.g., printing 49.3b2 applied prior to bonding of the sheets 38.3a and 38.3b), 50.3a (e.g., printing 49.3a1 applied prior to bonding of the sheets 38.3a and 38.3b), and/or 52.3a (e.g., printing 49.3a2). Two polymer material sheets 38.3a and 38.3b, and/or additional polymer material sheets, may be used instead of a single polymer material sheet to combine properties of different types of polymer materials.

Figure 7:
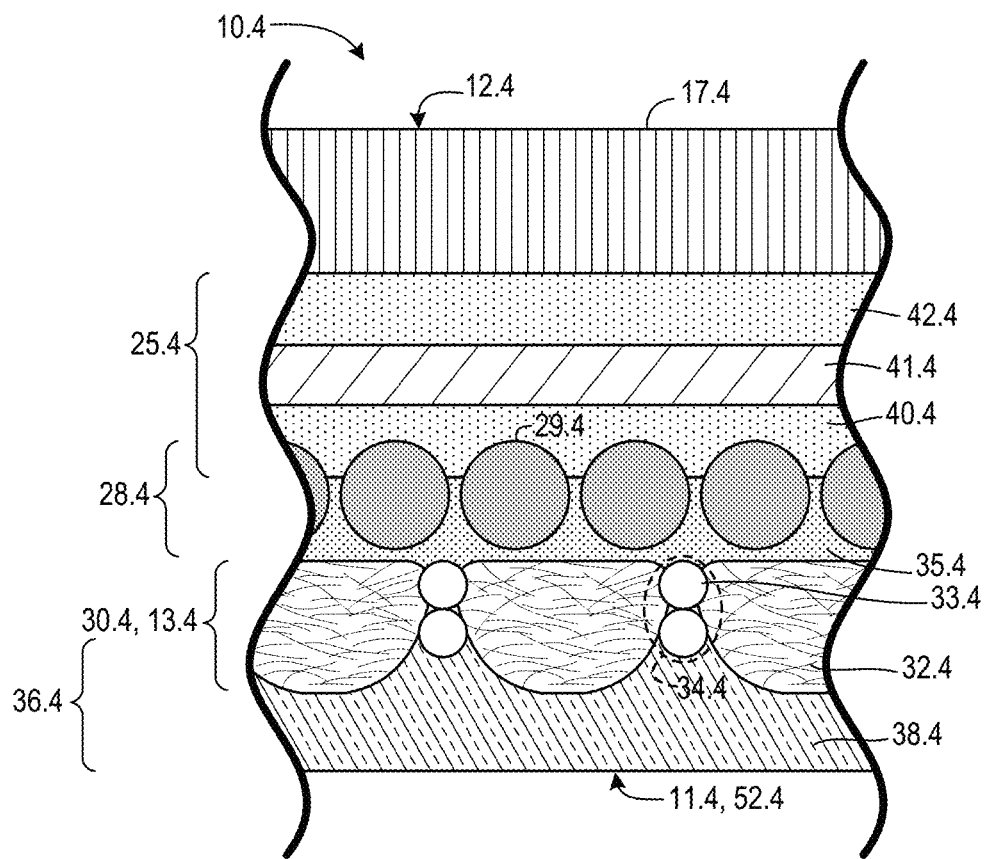
FIG. 7 is a partially schematic truncated cross-sectional view of an example load restraint similar to that of FIG. 1A, but that comprises a polymer film outer layer that has been ultrasonically welded to the base layer.

FIG. 7 is a partially schematic truncated cross-sectional view of a load restraint strip 10.4. Except as indicated below, the load restraint strip 10.4 may be the same as or similar to the load restraint strip 10.1. The cross-sectional view of FIG. 7 may be taken from a location in the load restraint strip 10.4 similar to the location, indicated in FIG. 1B, from which the cross-sectional view of FIG. 2A is taken. Exterior face 12.4, release paper liner 17.4, adhesive layer 25.4, reinforcement layer 28.4, reinforcement strands 29.4, base layer 30.4/band 13.4, mat 32.4, knitting yarn lengths 33.4, stitches 34.4, laminating adhesive 35.4, second adhesive sublayer 40.4, substrate sublayer 41.4, and first adhesive sublayer 42.4 may respectively be the same as (or similar to) the exterior face 12.1, the release paper liner 17.1, the adhesive layer 25.1, the reinforcement layer 28.1, the reinforcement strands 29.1, the base layer 30.1/band 13.1, the mat 32.1, the knitting yarn lengths 33.1, the stitches 34.1, the laminating adhesive 35.1, the second adhesive sublayer 40.1, the substrate sublayer 41.1, and the first adhesive sublayer 42.1 of the load restraint strip 10.1.

The polymer film layer 36.4 of the load restraint strip 10.4 comprises a polymer sheet material 38.4 that may be similar to the polymer material sheet 38.1, and may have a face 52.4 that forms an interior face 11.4 of the load restraint strip 10.4. However, and unlike the polymer material sheet 38.1 of the load restraint strip 10.1, the polymer material sheet 38.4 is bonded to the band 13.4 without an adhesive. For example, the polymer material sheet 38.4 may be bonded to the band 13.4 by ultrasonic or RF welding that causes the polymer sheet material 38.4 to melt and fuse with the band 13.4.

Figure 8A:
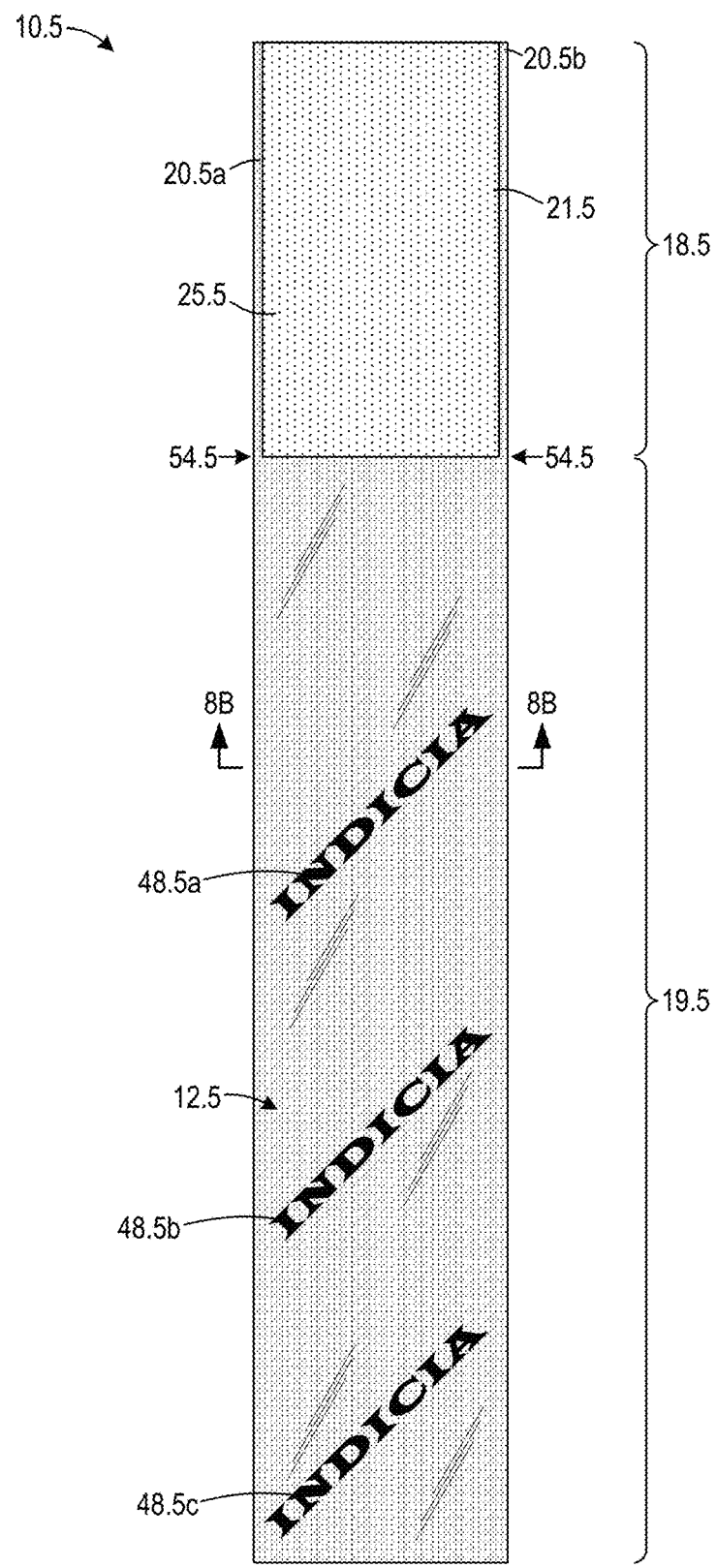
FIG. 8A is partially schematic plan view showing an exterior face of an example load restraint strip similar to that of FIG. 1A, but having a nonwoven fiber base layer and a polymer film outer layer on a portion of the exterior face.

FIG. 8A is partially schematic plan view showing an exterior face 12.5 of an example load restraint strip 10.5. Except as indicated below, the load restraint strip 10.5 may be the same as or similar to the load restraint strip 10.1. For example, an attachment region 18.5 of the load restraint strip 10.5 may be the same as or similar to the attachment region 18.1 of the load restraint strip 10. Adhesive subregion 21.5, handling subregions 20.5a and 20.5b, adhesive layer 25.5, and a release paper liner (not shown in FIG. 8A) of the load restraint strip 10.5 may respectively be the same as (or similar to) the adhesive subregion 21.1, the handling subregions 20.1a and 20.1b, the adhesive layer 25.1, and the release paper liner 17.1 of the load restraint strip 10.1. The load restraint strip 10.5 has indicia 48.5a, 48.5b, and 48.5c that are visible to an observer viewing the exterior face 12.5. More or fewer indicia may be present. Although the word "INDICIA" is used for an example, any of indicia 48.5a through 48.5c, and/or other indicia, may be any combination of letters, numbers, other characters, symbols and/or graphics. The indicia 48.5a through 48.5c need not be the same.

Figure 8B:
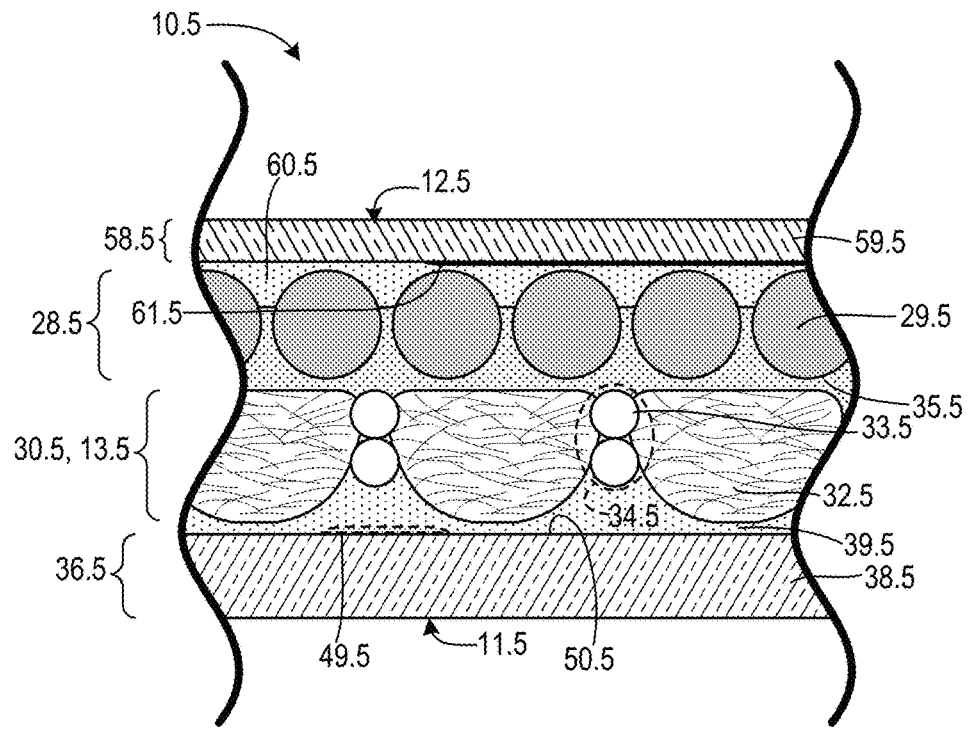
FIG. 8B is a partially schematic truncated cross-sectional view taken from the location indicated in FIG. 8A.

FIG. 8B is a partially schematic truncated cross-sectional view taken from the location indicated in FIG. 8A. Reinforcement layer 28.5, reinforcement strands 29.5, base layer 30.5/band 13.5, mat 32.5, knitting yarn lengths 33.5, stitches 34.5, laminating adhesive 35.5, polymer material sheet 38.5, and adhesive 39.5 may respectively be the same as (or similar to) the reinforcement layer 28.1, the reinforcement strands 29.1, the base layer 30.1/band 13.1, the mat 32.1, the knitting yarn lengths 33.1, the stitches 34.1, the laminating adhesive 35.1, the polymer material sheet 38.1, and the adhesive 39.1 of the load restraint strip 10.1. The interior face 11.5 may be the same as or similar to the interior face 11.1 of the load restraint strip 10.1, or may (e.g., if printing is included, as described below) be the same as or similar to the interior face 11.2 of the load restraint strip 10.2.

The load restraint strip 10.5 comprises, in the tail 19.5, a polymer film layer 58.5 that comprises a polymer material sheet 59.5. The polymer material sheet 59.5 may be bonded to the reinforcing strands 29.5 by an adhesive 60.5 (which may be a laminating adhesive such as those described above). The polymer material sheet 59.5 may be limited to the tail and may not extend into the attachment region 18.5 (e.g., the polymer material sheet 59.5 may only extend to the intermediate location 54.5 (FIG. 8A)). The polymer material sheet 59.5 may comprise the same material as the polymer material sheet 38.5 or may comprise a different material, and may have a thickness that is the same as or different from a thickness of the polymer film sheet 38.5.

The indicia 48.5a through 48.5c (and/or other indicia, if present) may be provided by printing 61.5 on an interior face of the polymer material sheet 59.5. Indicia visible on the interior face 11.5 (e.g., similar to the indicia 48.2a through 48.2e of the load restraint strip 10.2) may also or alternatively be provided by printing (e.g., printing 49.5) on an exterior face 50.5 of the polymer material sheet 38.5, by printing on an interior face of the sheet 38.5 (not shown), and/or by printing on an interior face of the band 13.5 (not shown).

Figure 9:
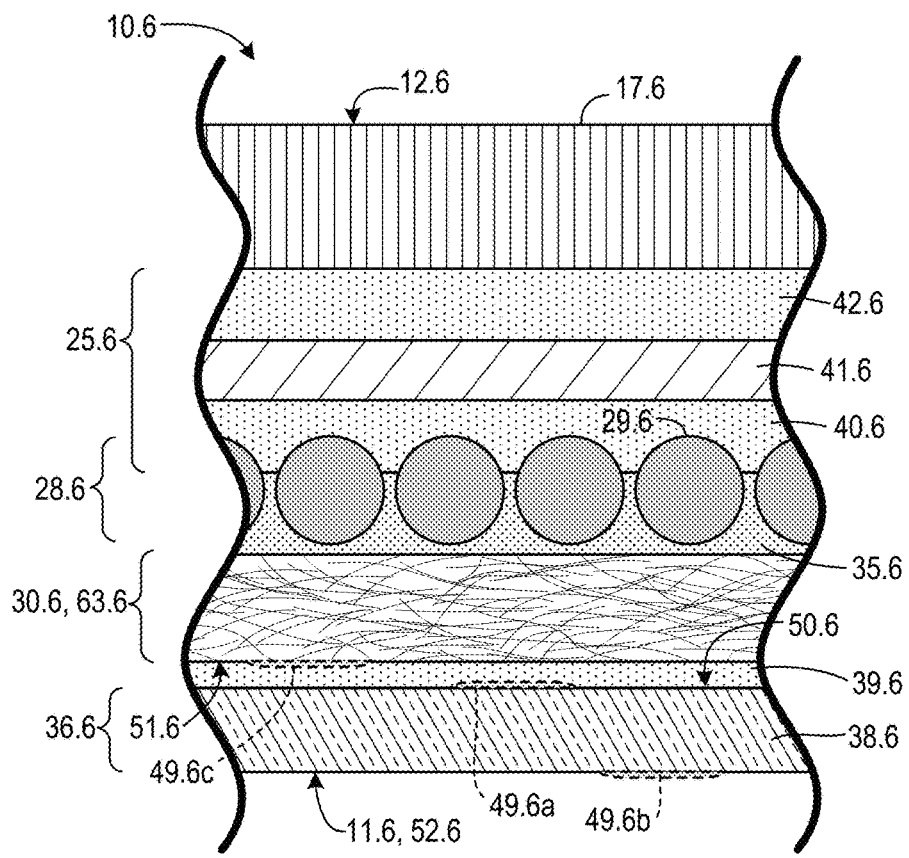
FIG. 9 is a partially schematic truncated cross-sectional view of an example load restraint similar to that of FIG. 1A, but that comprises another type of nonwoven fabric base layer.

FIG. 9 is a partially schematic truncated cross-sectional view of a load restraint strip 10.6. Except as indicated below, the load restraint strip 10.6 may be the same as or similar to the load restraint strip 10.1. The cross-sectional view of FIG. 9 may be taken from a location in the load restraint strip 10.6 similar to the location, indicated in FIG. 1B, from which the cross-sectional view of FIG. 2A is taken. Interior face 11.6, exterior face 12.6, release paper liner 17.6, adhesive layer 25.6, reinforcement layer 28.6, reinforcement strands 29.6, laminating adhesive 35.6, polymer film layer 36.6, polymer sheet material 38.6, adhesive 39.6, second adhesive sublayer 40.6, substrate sublayer 41.6, and first adhesive sublayer 42.6 may respectively be the same as (or similar to) the interior face 11.1, the exterior face 12.1, the release paper liner 17.1, the adhesive layer 25.1, the reinforcement layer 28.1, the reinforcement strands 29.1, the laminating adhesive 35.1, the polymer film layer 36.1, the polymer sheet material 38.1, the adhesive 39.1, the second adhesive sublayer 40.1, the substrate sublayer 41.1, and the first adhesive sublayer 42.1 of the load restraint strip 10.1.

A base layer 30.6 of the load restraint strip 10.6 comprises a band 63.6 of nonwoven fabric other than a stitchbond fabric. The load restraint strip 10.6 may also comprise indicia visible to an observer of the load restraint strip 10. Such indicia may be provided via printing (e.g., printing 49.6a on face 50.6 of the polymer sheet material 38.6, printing 49.6b on face 52.6 polymer sheet material 38.6, and/or printing 49.6c on face 51.6 of the band 63.6).

Figure 10A:
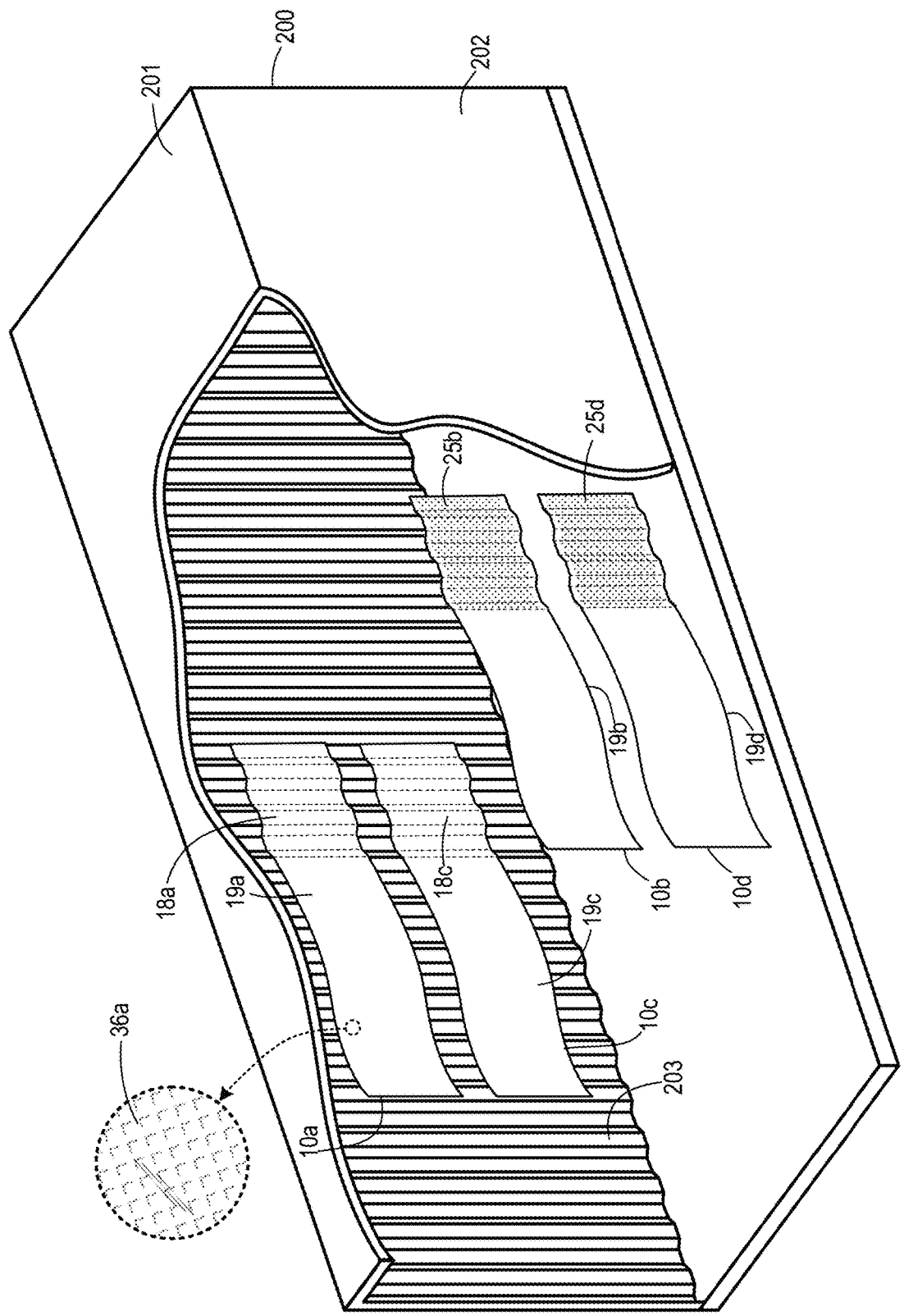
FIGS. 10A, 10B, 10C, 10D, 10E, and 10F show an example use of load restraint strips such as those described herein.

FIGS. 10A through 10F show an example use of four load restraint strips 10a, 10b, 10c, and 10d. Each of the load restraint strips 10a, 10b, 10c, and 10d may comprise a load restraint strip such as described herein (e.g., any of the load restraint strips 10.1, 10.2, 10.3, 10.4, 10.5, or 10.6). As shown in the enlargement of FIG. 10A, for example, an interior face of the load restraint strip 10a comprises a polymer film outer layer 36a. As also shown in FIG. 10A, the load restraint strips 10a and 10c have been attached to an inside surface of a left side wall 203 of a shipping container 200. In particular, release paper liners have been removed from attachment regions 18a and 18c to expose adhesive layers. Those adhesive layers were then pressed against the inside of the wall 203 so as to conform and adhere to the corrugated inside surface of wall 203. In a similar manner, release paper liners of the load restraint strips 10b and 10d were removed to expose adhesive layers 25b and 25d. The adhesive layers 25b and 25d were then pressed against the inside surface of wall 202 so as to conform and adhere to the corrugated inside surface of the wall 202. Although adhered adhesive layers 25b and 25d of load restraint strips 10b and 10d are shown in FIGS. 10A through 10F, the adhered-to inside surface of the wall 202, together with a portion of the roof 201 of the container 200, are omitted so that other details may be shown. As shown in FIG. 10A, tails 19a through 19d of the load restraint strips 10a through 10d may extend rearward and horizontally.

Figure 10B:
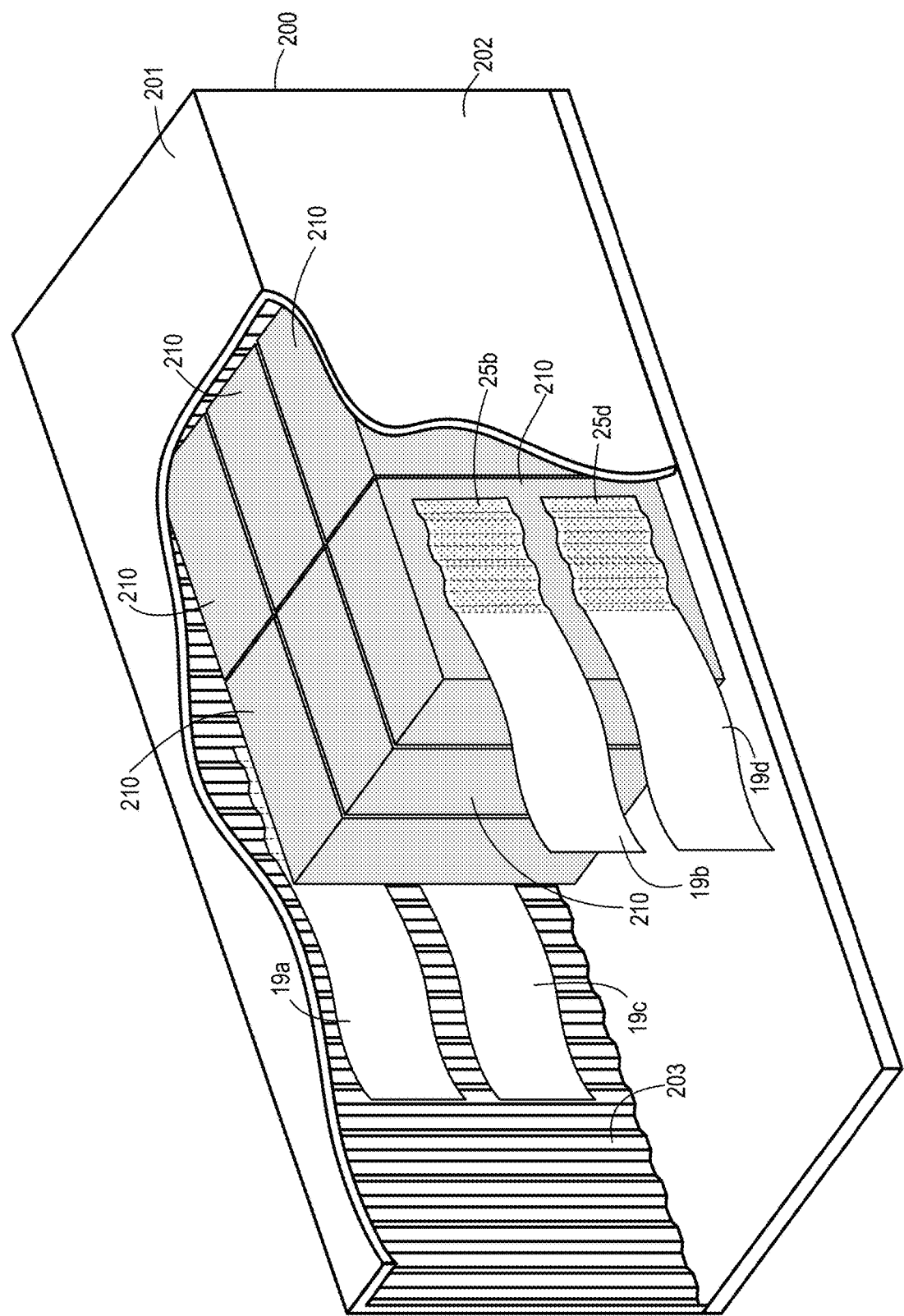
Figure 10C:
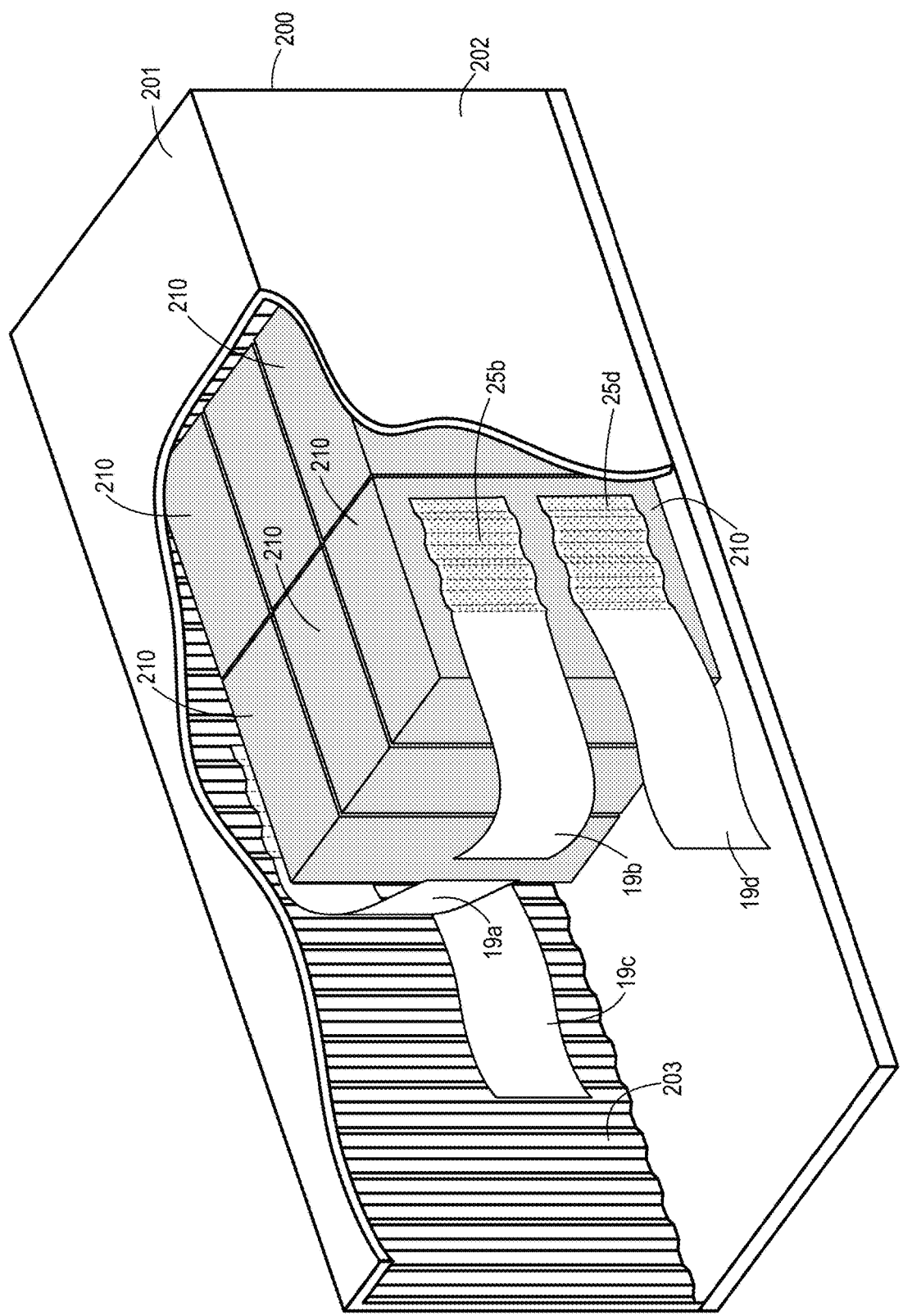
Figure 10D:
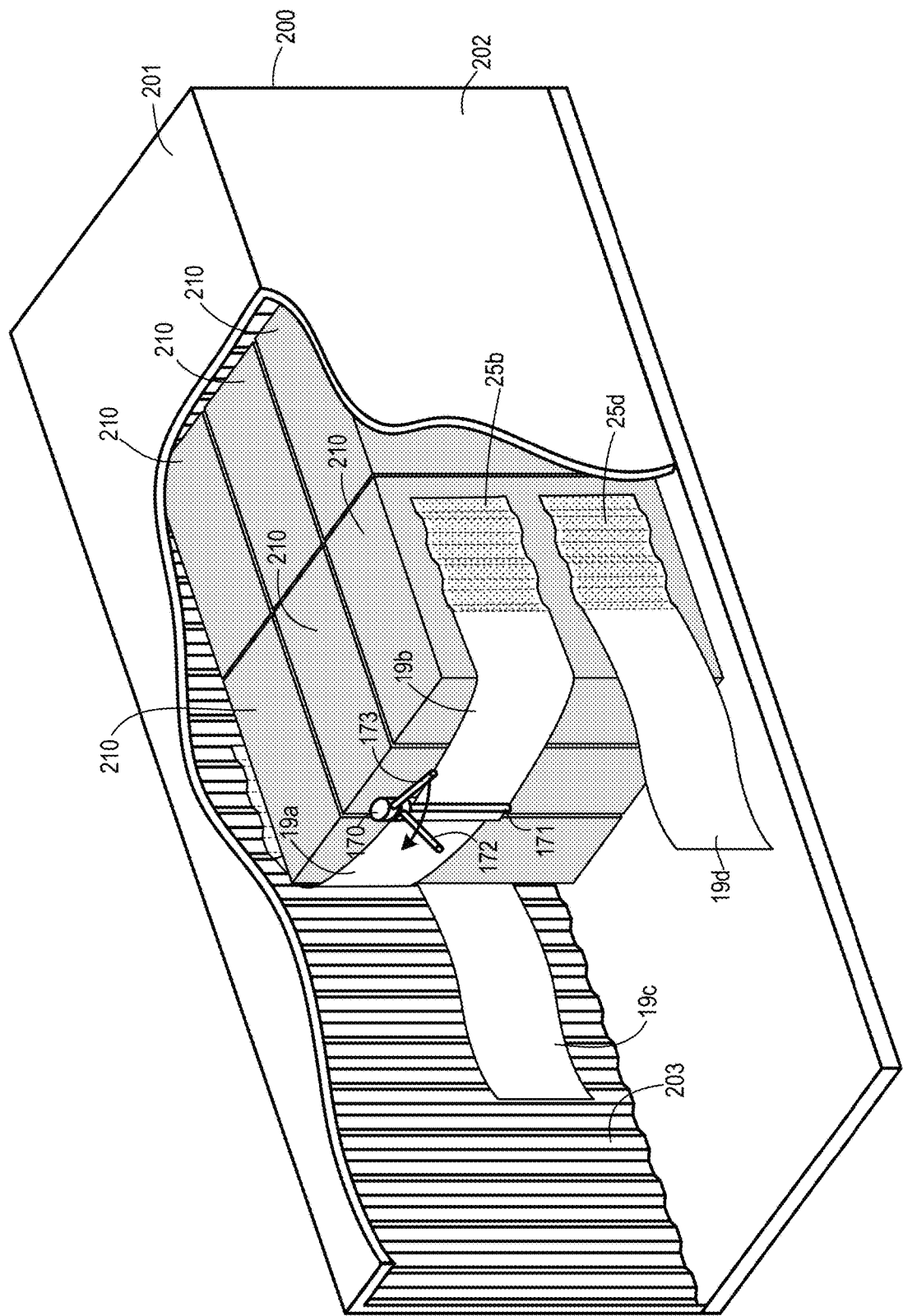
Figure 10E:
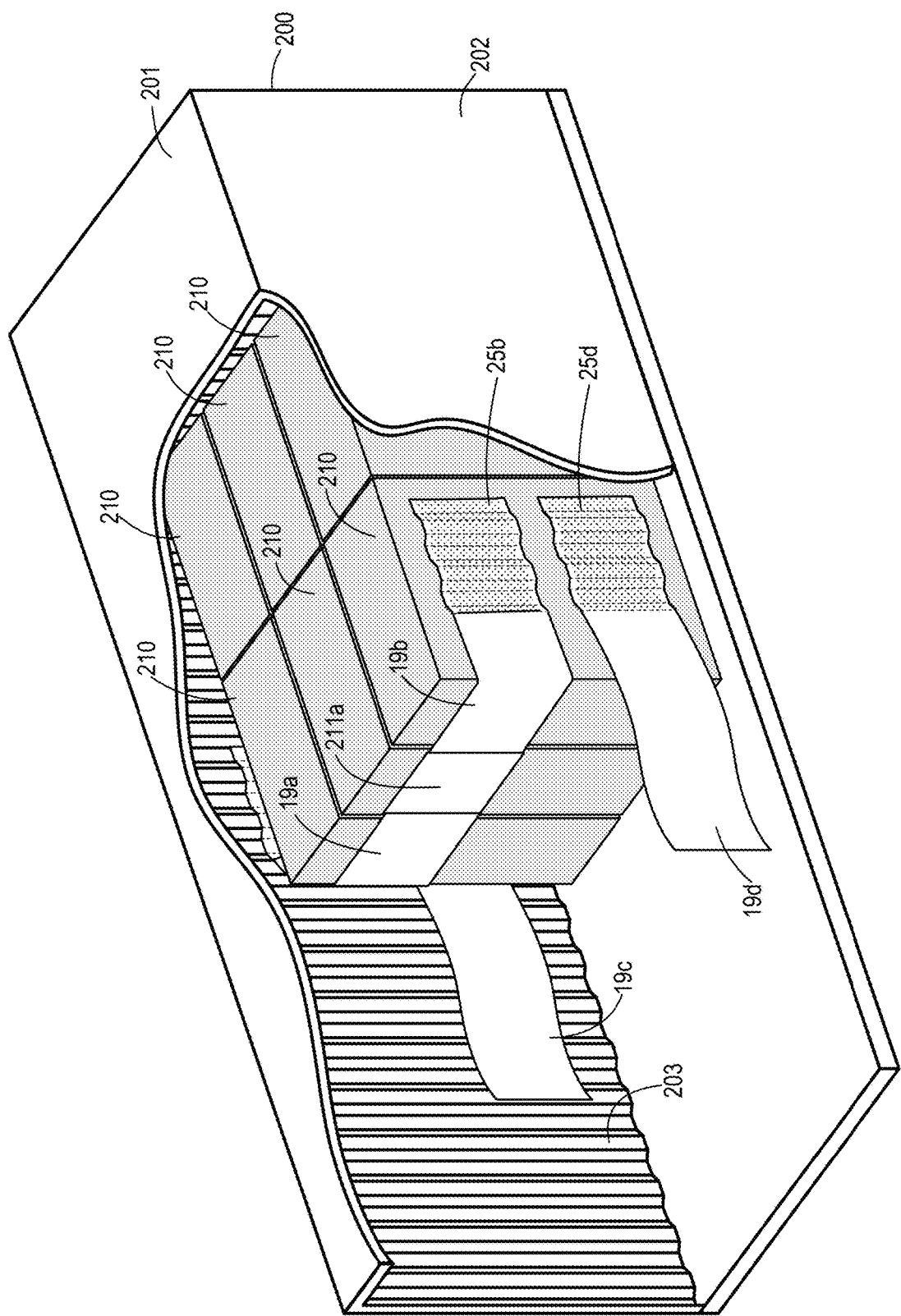
Figure 10F:
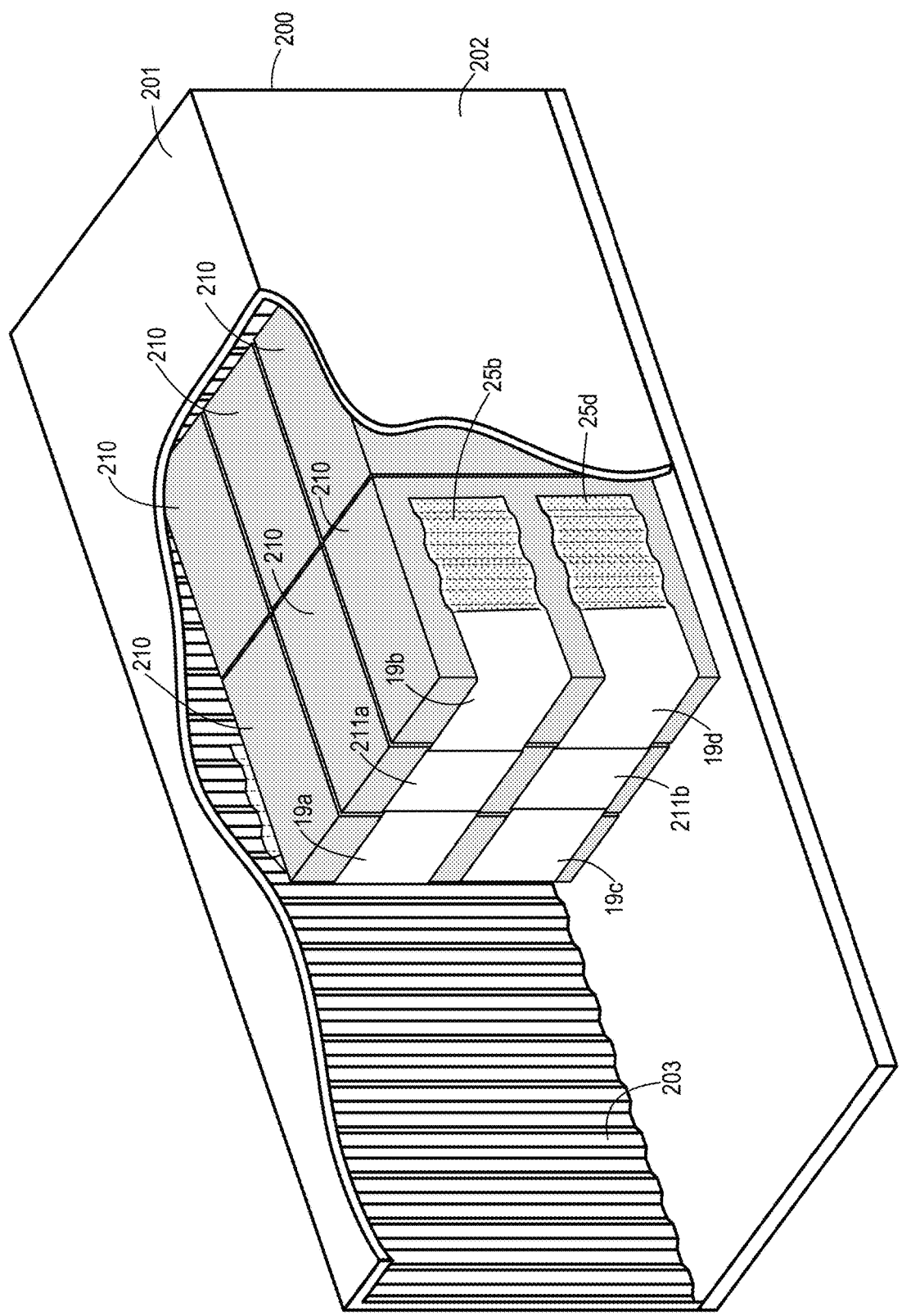

FIG. 10B shows container 200 after cargo units 210 have been loaded. Subsequently, and as shown in FIG. 10C, the tails 19a and 19b of the load restraint strips 10a and 10b are wrapped around the rear of the cargo units 210. As shown in FIG. 10D, a tightening tool 170 may then be placed over the overlapped ends of the tails 19a and 19b. The tool 170 includes a pair of tines 171 that define a slot. Only one of the tines 171 is visible in FIG. 10D. The tines 171 of tool 170 may be slid over the overlapped ends of the tails 19a and 19b so as to hold those overlapped ends in the slot between the tines 171. As seen in FIG. 10D, the tails 19a and 19b may be displaced lightly to the rear of cargo units 210 at this point so as to leave sufficient slack for tightening. After placement of the tool 170, the handle 172 is held stationary and the handle 173 is rotated in the direction indicated. This rotates the tines 171 and draws the tails 19a and 19b together, thereby tightening the strips 10a and 10b around cargo units 210. An adhesive-backed connecting patch is then affixed over the ends of the tails 19a and 19b while they are tightened, and the tool 170 is then removed. FIG. 10E shows ends of the tails 19a and 19b with a connecting patch 211a affixed. The steps described above may then be repeated for the tails 19c and 19d of the load restraint strips 10c and 10d. FIG. 10F shows ends of the tails 19c and 19d with a connecting patch 211b affixed.

Although the example of FIGS. 10A through 10F shows use of the load restraint strips 10a through 10d in a cargo container such as a shipping container, the load restraint strips 10a through 10d may similarly be used to secure cargo in other types of containers (e.g., semi truck trailers, shipping containers without corrugated side walls, etc.).

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. A load restraint strip comprising:
  a first polymer film layer extending continuously from a first end of the load restraint strip to a second end of the load restraint strip and from a first side edge of the load restraint strip to a second side edge of the load restraint strip, wherein a first face of the first polymer film layer forms a first outer face of the load restraint strip;
  a nonwoven fabric base layer, wherein a first face of the nonwoven fabric base layer is bonded to a second face of the first polymer film layer;
  a reinforcement layer comprising a plurality of substantially parallel strands bonded to a second face of the nonwoven fabric base layer;
  a second polymer film layer extending continuously from the first end of the load restraint strip to an intermediate location of the load restraint strip and from the first side edge of the load restraint strip to the second side edge of the load restraint strip, wherein a first face of the second polymer film layer forms a first portion of a second outer face of the load restraint strip that is located opposite the first outer face of the load restraint strip, and wherein the intermediate location is between the first end and the second end; and
  an adhesive layer bonded to the reinforcement layer and forming a second portion of the second outer face of the load restraint strip between the intermediate location and the second end of the load restraint strip.

2. The load restraint strip of claim 1, wherein the nonwoven fabric base layer comprises a stitchbond fabric.

3. The load restraint strip of claim 1, wherein the first polymer film layer comprises a nonporous polymer material sheet.

4. The load restraint strip of claim 1, wherein the first polymer film layer comprises a transparent or translucent nonporous film.

5. The load restraint strip of claim 1, wherein the first polymer film layer comprises one or more of polyethylene, polyethylene terephthalate, biaxially-oriented polypropylene, polypropylene, high density polyethylene, medium density polyethylene, or low density polyethylene.

6. The load restraint strip of claim 1, wherein the first polymer film layer comprises a plurality of polymer material sheets bonded to each other.

7. The load restraint strip of claim 1, wherein the first polymer film layer comprises printing, applied to the second face of the first polymer film layer, forming indicia on the load restraint strip.

8. The load restraint strip of claim 1, wherein one or more of the first face of the first polymer film layer or the first face of the nonwoven fabric base layer comprises printing forming indicia on the load restraint strip.

9. The load restraint strip of claim 1, wherein the second polymer film layer comprises printing, applied to an interior face of the second polymer film layer, forming indicia on the load restraint strip.

10. The load restraint strip of claim 1, wherein the first face of the nonwoven fabric base layer is bonded to the second face of the first polymer film layer without an adhesive by an ultrasonic weld bond or an RF weld bond.

11. A load restraint strip comprising:
a polymer film layer extending continuously from a first end of the load restraint strip to at least an intermediate location of the load restraint strip and from a first side edge of the load restraint strip to a second side edge of the load restraint strip, wherein a first face of the polymer film layer forms at least a portion of a first outer face of the load restraint strip, and wherein the intermediate location is between the first end and a second end of the load restraint strip;
a nonwoven fabric base layer, wherein a first face of the nonwoven fabric base layer is bonded to a second face of the polymer film layer without an adhesive by an ultrasonic weld bond or an RF weld bond;
a reinforcement layer comprising a plurality of substantially parallel strands bonded to a second face of the nonwoven fabric base layer; and
an adhesive layer bonded to the reinforcement layer and forming a portion of a second outer face of the load restraint strip, wherein the second outer face is located opposite the first outer face.

12. The load restraint strip of claim 11, wherein the polymer film layer extends continuously from the first end to the second end.

13. The load restraint strip of claim 11, wherein the polymer film layer comprises printing, applied to the second face of the polymer film layer, forming indicia on the load restraint strip.

14. The load restraint strip of claim 11, wherein the polymer film layer comprises a plurality of polymer material sheets bonded to each other.

15. A load restraint strip comprising:
a polymer film layer extending continuously from a first end of the load restraint strip to at least an intermediate location of the load restraint strip and from a first side edge of the load restraint strip to a second side edge of the load restraint strip, wherein a first face of the polymer film layer forms at least a portion of a first outer face of the load restraint strip, wherein the intermediate location is between the first end and a second end of the load restraint strip wherein the polymer film layer comprises printing, applied to a second face of the polymer film layer, forming indicia on the load restraint strip, wherein the second face of the polymer film layer is located opposite the first face of the polymer film layer, and wherein the polymer film layer comprises a transparent or translucent film such that the indicia printed on the second face of the polymer film layer is visible at the first outer face of the load restraint strip through the polymer film layer;
a nonwoven fabric base layer fixed relative to the polymer film layer;
a reinforcement layer comprising a plurality of substantially parallel strands bonded to a face of the nonwoven fabric base layer; and
an adhesive layer bonded to the reinforcement layer and forming a portion of a second outer face of the load restraint strip, wherein the second outer face is located opposite the first outer face.

16. The load restraint strip of claim 15, wherein the polymer film layer comprises a plurality of polymer material sheets bonded to each other.

17. The load restraint strip of claim 15, wherein the polymer film layer extends continuously from the first end to the second end.

18. The load restraint strip of claim 15, wherein the polymer film layer comprises one or more of polyethylene, polyethylene terephthalate, biaxially-oriented polypropylene, polypropylene, high density polyethylene, medium density polyethylene, or low density polyethylene.

19. The load restraint strip of claim 11, wherein the polymer film layer comprises one or more of polyethylene, polyethylene terephthalate, biaxially-oriented polypropylene, polypropylene, high density polyethylene, medium density polyethylene, or low density polyethylene.

20. The load restraint strip of claim 15, wherein the nonwoven fabric base layer is bonded to the polymer film layer without an adhesive by an ultrasonic weld bond or an RF weld bond.

* * * * *